(12) United States Patent
Kouno

(10) Patent No.: US 10,474,402 B2
(45) Date of Patent: Nov. 12, 2019

(54) PRINTING SYSTEM, PRINT MANAGEMENT SERVER, COMMUNICATION RELAY DEVICE, AND RECORDING MEDIUM

(71) Applicant: Konica Minolta, Inc., Tokyo (JP)

(72) Inventor: Takahiro Kouno, Kawanishi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/588,409

(22) Filed: May 5, 2017

(65) Prior Publication Data

US 2017/0322755 A1    Nov. 9, 2017

(30) Foreign Application Priority Data

May 6, 2016    (JP) .................................. 2016-093383

(51) Int. Cl.
*G06F 3/12*    (2006.01)

(52) U.S. Cl.
CPC ............ *G06F 3/1236* (2013.01); *G06F 3/122* (2013.01); *G06F 3/1205* (2013.01); *G06F 3/1211* (2013.01); *G06F 3/1244* (2013.01); *G06F 3/1248* (2013.01); *G06F 3/1288* (2013.01); *G06F 3/1286* (2013.01)

(58) Field of Classification Search
CPC .................................................... G06F 3/1236
See application file for complete search history.

(56) References Cited

U.S. PATENT DOCUMENTS

| 5,657,390 A * | 8/1997 | Elgamal | H04L 29/06 713/151 |
| 8,610,935 B1 * | 12/2013 | McKinley | G06F 3/1204 358/1.15 |
| 2007/0035766 A1 * | 2/2007 | Yamamura | H04L 63/0428 358/1.15 |

(Continued)

FOREIGN PATENT DOCUMENTS

| JP | 2006-277003 A | 10/2006 |
| JP | 2008-176426 A | 7/2008 |

(Continued)

OTHER PUBLICATIONS

Japan Patent Application No. 2016-093383; Notice of Reasons for Refusal; dated Sep. 17, 2019; 9 pages.

*Primary Examiner* — King Y Poon
*Assistant Examiner* — Michael L Burleson
(74) *Attorney, Agent, or Firm* — Baker Hostetler

(57) ABSTRACT

A print management server provided outside a predetermined LAN includes a receiver, a processor, and a transmitter. The receiver receives a print output instruction from a communication terminal of a user, the print output instruction being issued to a print output device provided inside the predetermined LAN and being an instruction to print out a print target file. The processor determines whether the print target file is present inside the predetermined LAN. When it is determined that the print target file is present inside the predetermined LAN, the transmitter transmits a generation command to a communication relay device inside the pre- (Continued)

determined LAN, the generation command being a command to generate print job data on the basis of the print target file acquired by the communication relay device and a print setting instruction.

11 Claims, 32 Drawing Sheets

(56) References Cited

U.S. PATENT DOCUMENTS

| | | | |
|---|---|---|---|
| 2012/0120437 A1* | 5/2012 | Nanaumi | G06F 3/1205 358/1.15 |
| 2016/0173709 A1* | 6/2016 | Kouno | H04N 1/00244 358/1.15 |

FOREIGN PATENT DOCUMENTS

| | | |
|---|---|---|
| JP | 2010-092463 A | 4/2010 |
| JP | 2016038687 | 3/2016 |

* cited by examiner

Fig. 10

MODE M1 (NORMAL OPERATION)
(UPLOADING AND PRINTING FROM TERMINAL OUTSIDE LAN)

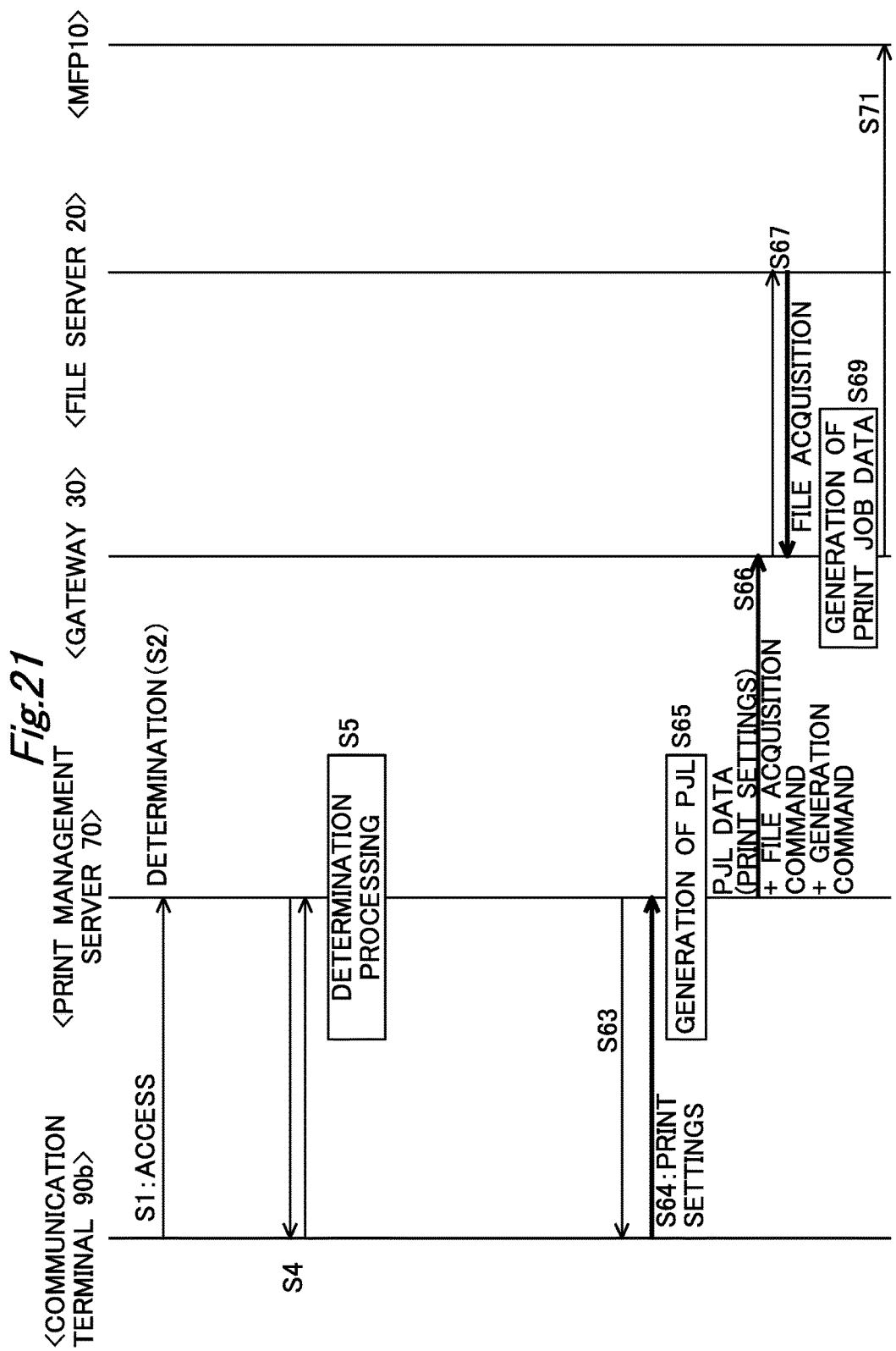

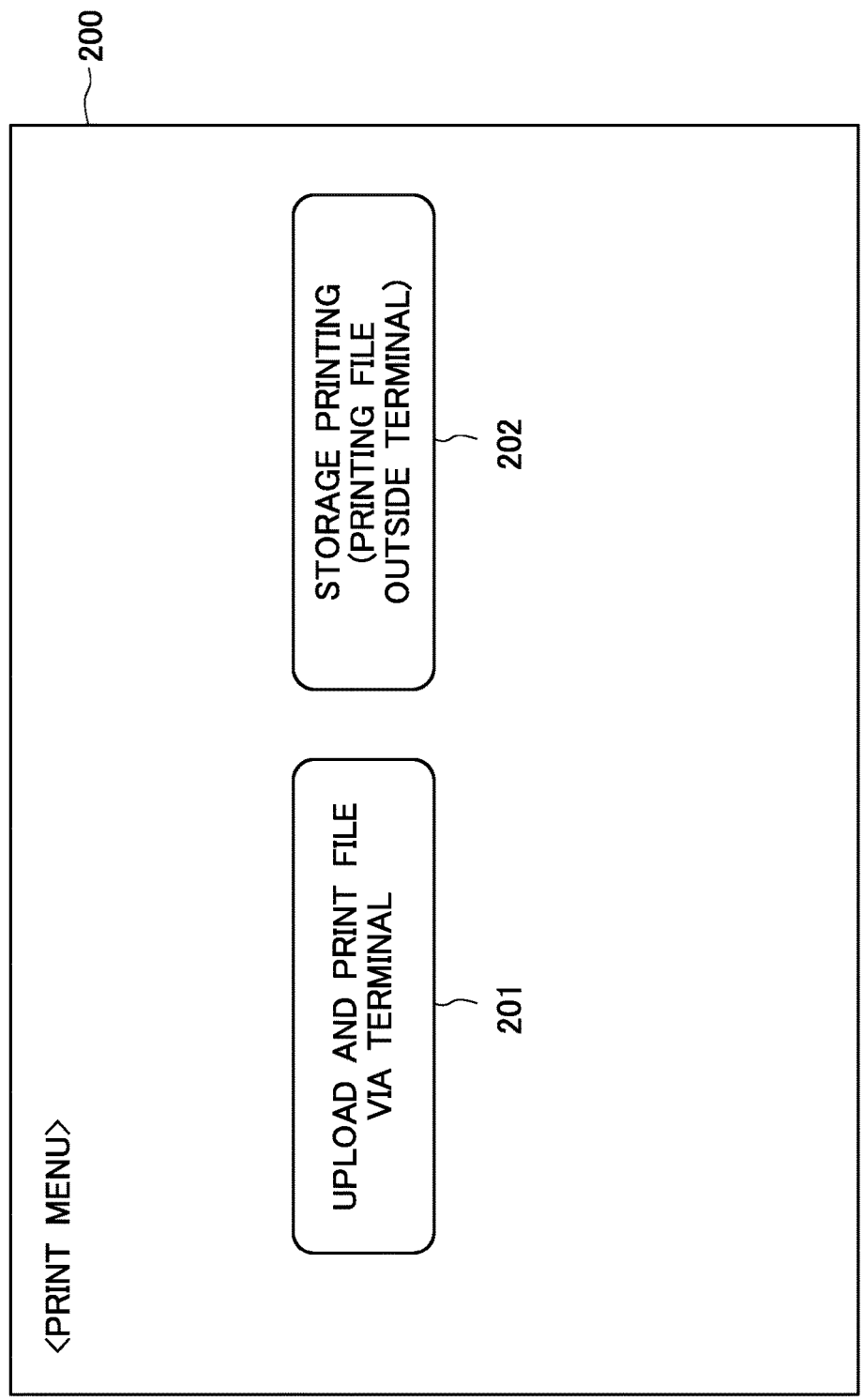

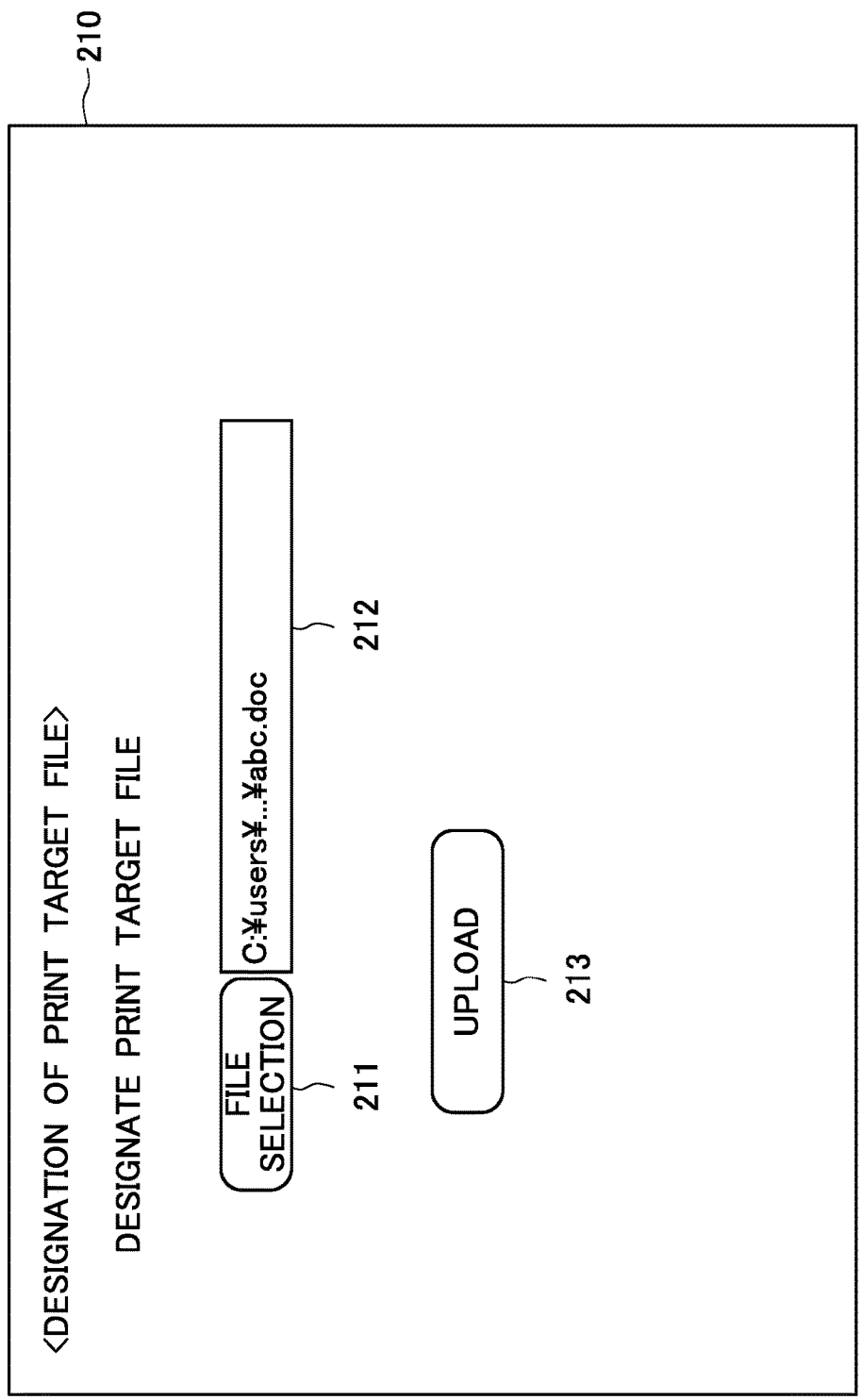

Fig.25

```
<html> <body>
<form id="my_form" action="http://cloudabc.com/cgi-bin/upload.cgi"
       method="post" enctype="multipart/form-data" >
<input type="file" name="input_file" >
<br> <input type="submit" value="TRANSMIT" > </form>
<script type="text/javascript">
(function(){
  form.addEventListener("submit" , function(e){
    e.preventDefault();
    var form_data = new FormData(form);
    var xhr = new XMLHttpRequest();
    xhr.onload = function (e){
      xhr.open("POST" , "http://cloudabc.com/cgi-bin/upload.cgi?type=json");    ← P1
      xhr.send(form_data); }); })();
    :
    :
</script></body></html>
```

Fig.26

```
<html> <body>
<form id="my_form" action="http://cloudabc.com/cgi-bin/upload.cgi"
        method="post" enctype="multipart/form-data" >
<input type="file" name="input_file" >
<br> <input type="submit" value="TRANSMIT" > </form>
<script type="text/javascript">
(function(){
    form.addEventListener("submit" , function(e){
        e.preventDefault();
        var form_data = new FormData(form);
        var xhr = new XMLHttpRequest();
        xhr.onload = function (e){
            xhr.open("POST" , "http://gwaddress.com/cgi-bin/upload.cgi?type=json");   ← P1
            xhr.send(form_data); }); })();
:
:
</script></body></html>
```

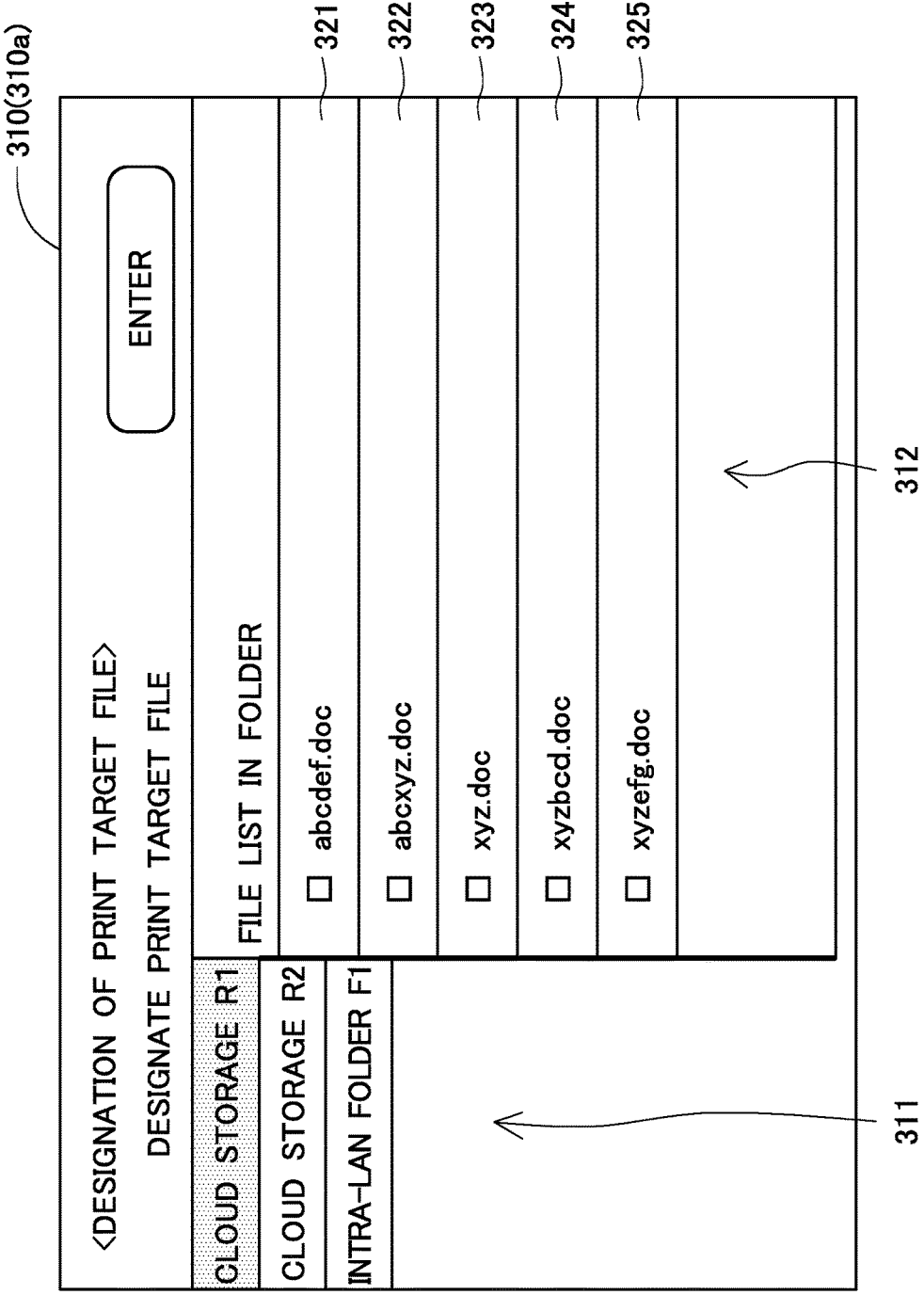

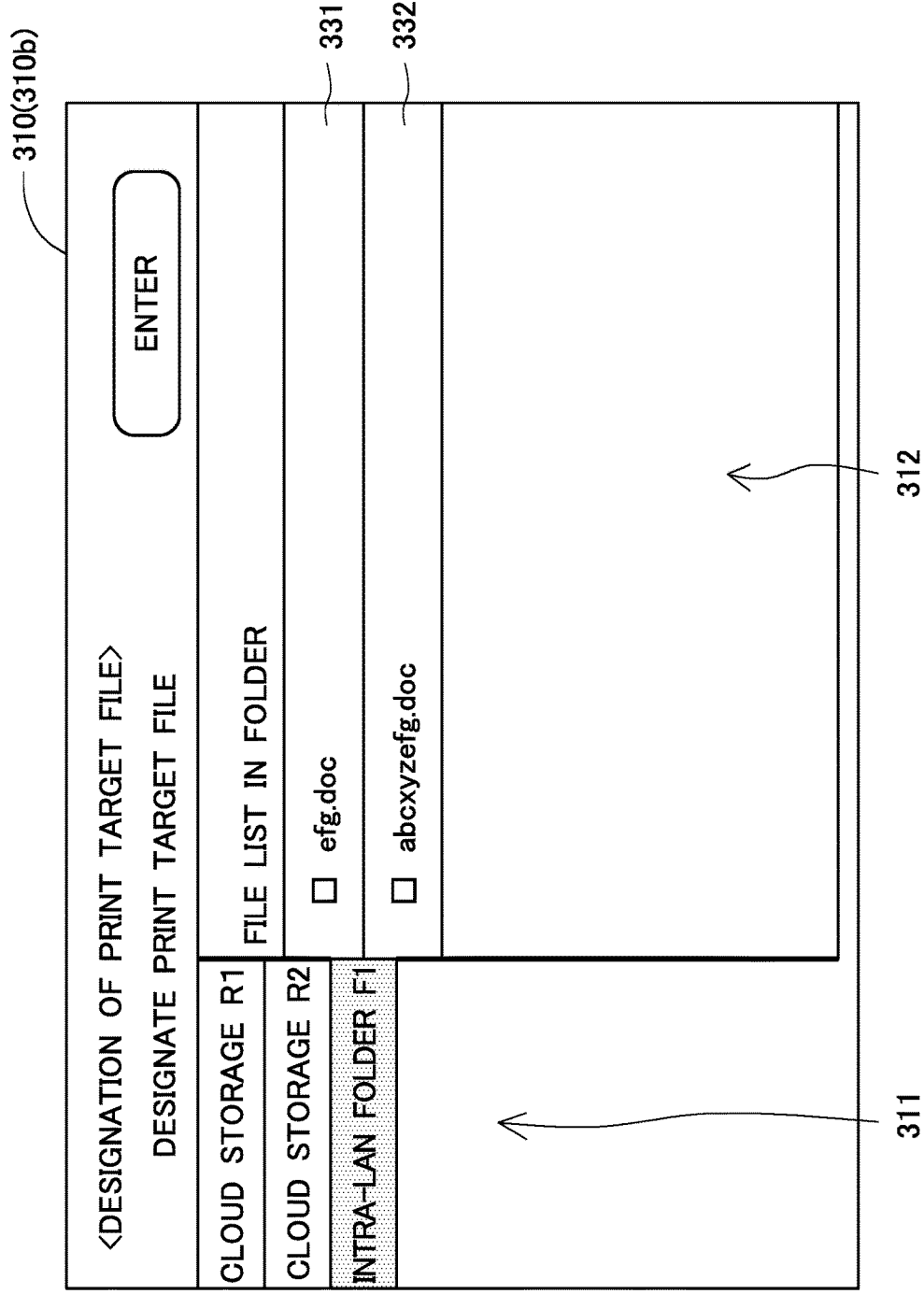

Fig.30

```
<Header>
content-length:
...
Doc Path: ¥¥server¥...¥...¥folder2¥efg.doc
Doc Action: iD="ABCDE" Password="*****""
...
```

PRINTING SYSTEM, PRINT MANAGEMENT SERVER, COMMUNICATION RELAY DEVICE, AND RECORDING MEDIUM

The present U.S. patent application claims priority under the Paris Convention and 35 U.S.C. § 119 to Japanese Patent Application No. 2016-093383 filed on May 6, 2016, the entirety of which is incorporated herein by reference.

BACKGROUND OF INVENTION

Technical Field

The present invention relates to a printing system and techniques related thereto.

Background Art

There are techniques for interfacing between servers (e.g., cloud servers) outside local area networks (LANs) and devices (e.g., image forming apparatuses) inside the LANs.

One example is a technique for printing out an electronic document stored in a server (cloud server) in a cloud through the use of an image forming apparatus (print output device) on a local side (inside a LAN) (see Japanese Patent Application Laid-Open No. 2016-38687).

Japanese Patent Application Laid-Open No. 2016-38687 discloses a document output system (communication system) that includes image forming apparatuses (devices) and a cloud server. In this system, an electronic document stored in the cloud server is transmitted to an image forming apparatus and printed out by the image forming apparatus. Note that the image forming apparatus is provided inside a LAN, and the cloud server is provided outside the LAN.

In the technique as described above, the cloud server always acquires data of a print target file. Then, the cloud server generates print job data on the basis of the data of the print target file and transmits the generated print job data to the image forming apparatus.

Thus, even if print target data is inside the LAN, the print target data is transmitted from inside the LAN to the cloud server, and then data that substantially includes the print target data is transmitted from the cloud server to an image forming apparatus inside the LAN.

To be more specific, for example, as illustrated in FIG. 31, data of a print target file is transmitted from a communication terminal 90 inside a LAN 109 to a cloud server (also referred to as a "print management server") 70, and then data (print job data) that substantially includes the data of the print target file is transmitted from the cloud server 70 to an image forming apparatus 10 inside the LAN. Then, the image forming apparatus 10 (e.g., Multi-Functional Peripheral; MFP) prints out the print job data.

In this way, the data of the print target file is once transmitted to the cloud server 70 (also referred to as an "external server") even if the print target data is inside the LAN 109 to which the MFP 10 belongs. In other words, the data of the print target file passes through a communication route (in particular, an external communication route) between a device inside the LAN and the cloud server (external server) substantially twice. Thus, problems may arise such as an increase in network communication load.

Similar problems may also arise when the print target file is stored inside a LAN (e.g., file server 20) as illustrated in FIG. 32. More specifically, when information about the storage location of the print target file (e.g., information about the file path of the storage location) is transmitted from the communication terminal 90 to the print management server 70, the print management server 70 in the cloud accesses the storage location (e.g., file server 20 inside the LAN) of the print target file and acquires the print target file from the device at the storage location inside the LAN. Thereafter, the print management server 70 generates print job data on the basis of the acquired data of the print target file and transmits the print job data (data that substantially includes the data of the print target file) to an MFP 10 inside the LAN. Then, the MFP 10 prints out the print job data. In FIGS. 31 and 32, the data of the print target file is transmitted via a gateway 30 from the device outside the LAN to the device inside the LAN.

In this case as well, the data of the print target file passes through the communication route between the LAN and the external server (cloud server) substantially twice as described above. This will increase network communication load.

SUMMARY OF INVENTION

It is an object of the present invention to provide a technique for suppressing an increase in communication load in print services provided using external servers.

According to a first aspect of the present invention, a print management server provided outside a predetermined LAN, includes a receiver configured to accept a print output instruction from a communication terminal of a user, the print output instruction being given to a print output device provided inside the predetermined LAN and being an instruction to print out a print target file, a processor configured to determine whether the print target file is present inside the predetermined LAN, and a transmitter configured to, when it is determined that the print target file is present inside the predetermined LAN, transmit a generation command to a communication relay device inside the predetermined LAN, the generation command being a command to generate print job data on the basis of the print target file acquired by the communication relay device and a print setting instruction.

According to a second aspect of the present invention, a communication relay device for relaying communication between a print output device provided inside a predetermined LAN and a print management server provided outside the predetermined LAN, the communication relay device includes a receiver configured to, when the print management server determines, on the basis of a print output instruction, that a print target file is present inside a predetermined LAN, receive a generation command from the print management server, the generation command being a command to generate print job data on the basis of a print setting instruction and the print target file, and the print output instruction being an instruction to print out the print target file and transmitted from a communication terminal of a user to the print management server, a processor configured to acquire the print target file and generate print job data on the basis of the print target file and the print setting instruction in response to the generation command, and a transmitter configured to transmit the print job data to the print output device.

According to a third aspect of the present invention, a non-transitory computer-readable recording medium for recording a program that causes a computer built into a print management server provided outside a predetermined LAN to execute the steps of a) accepting a print output instruction from a communication terminal of a user, the print output instruction being given to a print output device provided inside the predetermined LAN and being an instruction to print out a print target file, b) determining whether the print target file is present inside the predetermined LAN, and c) when it is determined that the print target file is present inside the predetermined LAN, transmitting a generation command to a communication relay device inside the predetermined LAN, the generation command being a command to generate print job data on the basis of the print target file acquired by the communication relay device and a print setting instruction.

According to a fourth aspect of the present invention, a non-transitory computer-readable recording medium for recording a program that causes a computer built into a communication relay device for relaying communication between a print output device provided inside a predetermined LAN and a print management server provided outside the predetermined LAN to execute the steps of a) when the print management server determines on the basis of a print output instruction that a print target file is present inside the predetermined LAN, receiving a generation command from the print management server, the generation command being a command to generate print job data on the basis of a print setting instruction and the print target file, and the print output instruction being an instruction to print out the print target file and being transmitted from a communication terminal of a user to the print management server, b) acquiring the print target file, c) generating print job data on the basis of the print target file and the print setting instruction in response to the generation command, and d) transmitting the print job data to the print output device.

According to a fifth aspect of the present invention, a printing system includes a print output device provided inside a predetermined LAN, a print management server according to the first aspect of the present invention, and a communication relay device provided inside the predetermined LAN and configured to relay communication between the print management server and the print output device. The communication relay device includes a processor configured to acquire the print target file and generate print job data on the basis of the print target file and the print setting instruction in response to the generation command, and a transmitter configured to transmit the print job data to the print output device.

These and other objects, features, aspects and advantages of the present invention will become more apparent from the following detailed description of the present invention when taken in conjunction with the accompanying drawings.

BRIEF DESCRIPTION OF DRAWINGS

FIG. 10 illustrates that a communication terminal outside the LAN performs a print output operation in the mode M1.

FIG. 21 is a timing chart of the operation in FIG. 8.

FIG. 22 illustrates a menu screen.

FIG. 23 illustrates an operation screen for uploading a file from the communication terminal.

FIG. 24 illustrates an operation screen for uploading a file from the communication terminal.

FIG. 25 illustrates default operation screen data (display data before change).

FIG. 26 illustrates changed operation screen data (display data after change).

FIG. 27 illustrates an operation screen for designating a print target file.

FIG. 28 illustrates an operation screen for designating a print target file.

FIG. 30 illustrates an example description of an acquisition command transmitted from the print management server to the gateway.

DETAILED DESCRIPTION OF PREFERRED EMBODIMENTS

Hereinafter, an embodiment of the present invention will be described with reference to the drawings. However, the scope of the invention is not limited to the illustrated examples.

1. System Configuration

Figure 1:
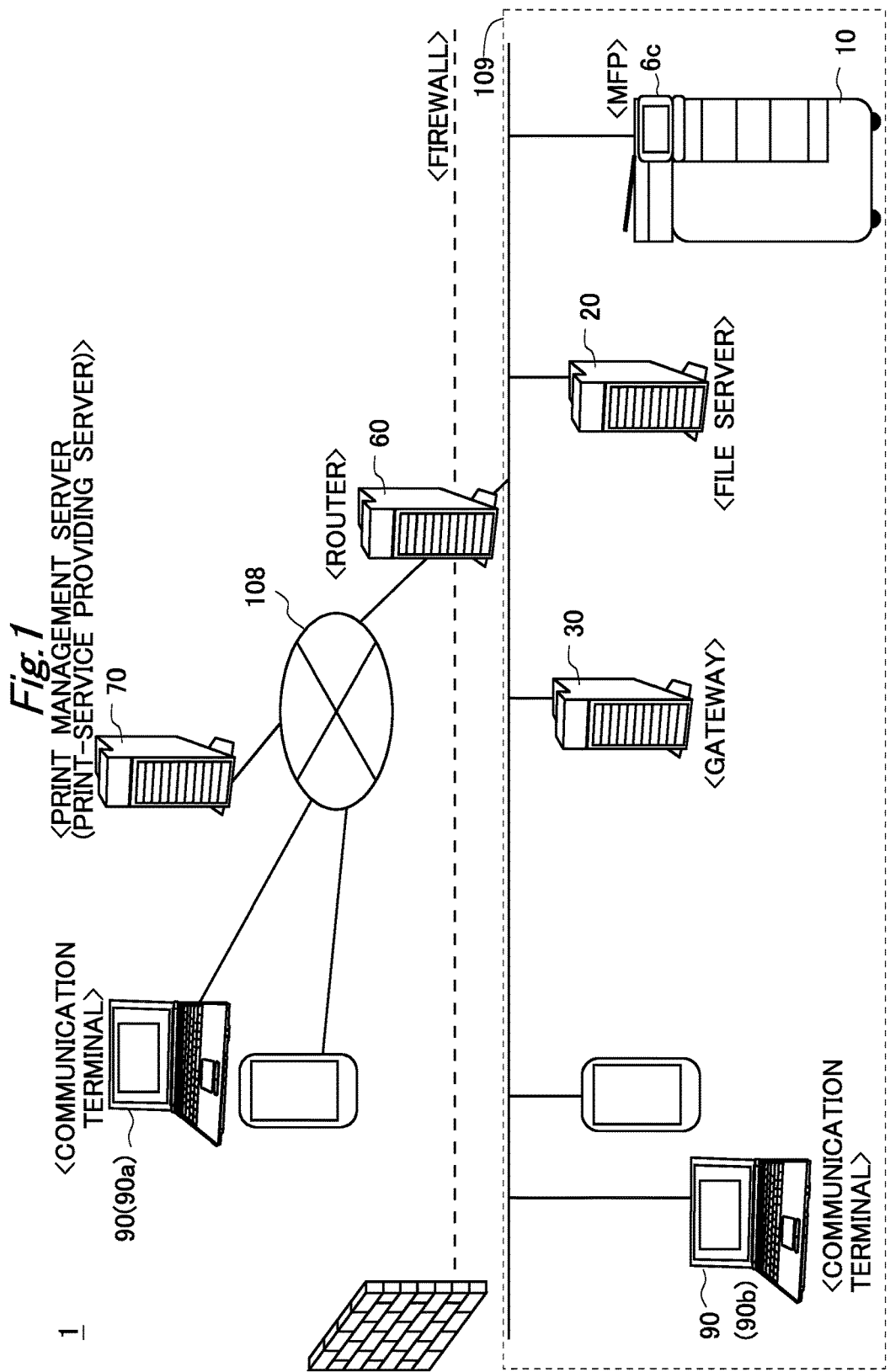
FIG. 1 illustrates a schematic configuration of a communication system.

FIG. 1 illustrates a schematic configuration of a communication system 1 according to an embodiment of the present invention. As illustrated in FIG. 1, the communication system 1 includes a Multi-Functional Peripheral (also abbreviated as "MFP") 10, a file server computer 20, a gateway 30, a router 60, a print management server computer (hereinafter also simply referred to as a "print management server") 70, and communication terminals 90. The MFP 10 is also referred to as a "print output device" or an "image forming apparatus."

The constituent elements 10, 20, 30, 60, 70, and 90 are connected to one another via a network 108 and are capable of network communications. The network 108 may be configured by local area networks (LANs), wide area networks (WAN), and the Internet. Forms of connection to the network 108 may be wired or wireless.

The MFP 10, the file server 20, and the gateway 30 are provided inside a LAN 109 that is built in, for example, a company. On the other hand, the print management server 70 is provided outside the LAN 109. To be more specific, the print management server 70 is provided as a cloud server computer (hereinafter, also simply referred to as a "cloud server"). The router 60 is provided spanning the inside and outside of the LAN 109 and performs routing processing between two networks, i.e., internal and external networks of the LAN 109. The communication terminals 90 may be present inside the LAN 109 or may be present outside the LAN 109. For example, a communication terminal 90a is present outside the LAN 109, and a communication terminal 90b is present inside the LAN 109. The LAN 109 is protected by a firewall function of the router 60.

The gateway 30 is constructed by, for example, a so-called computer (e.g., personal computer). The gateway 30 has a function of relaying communications between the MFP 10 and the print management server 70 and is thus also referred to as a "communication relay device."

The print management server 70, the communication terminals 90, and the file server 20 are constructed by, for example, so-called computers. To be more specific, the communication terminals 90 are constructed as, for example, notebook-type personal computers.

Note that the communication terminals 90 may also be referred to as client computers (hereinafter, also simply referred to as "clients").

In this communication system 1, for example, instructions such as a print output instruction transmitted from a communication terminal 90 to the print management server 70 is transmitted from the print management server 70 via the gateway 30 to the MFP 10, and the MFP 10 produces a printout.

The print management server 70 is a device that carries out, for example, communication with the communication terminal 90 and the gateway 30 and manages print processing performed by the MFP 10. The print management server 70 accepts a print request to the MFP 10 from a communication terminal 90, and in response to the print request, transmits a print command via the gateway 30 to the MFP 10.

2. Configuration of MFP 10

Figure 2:
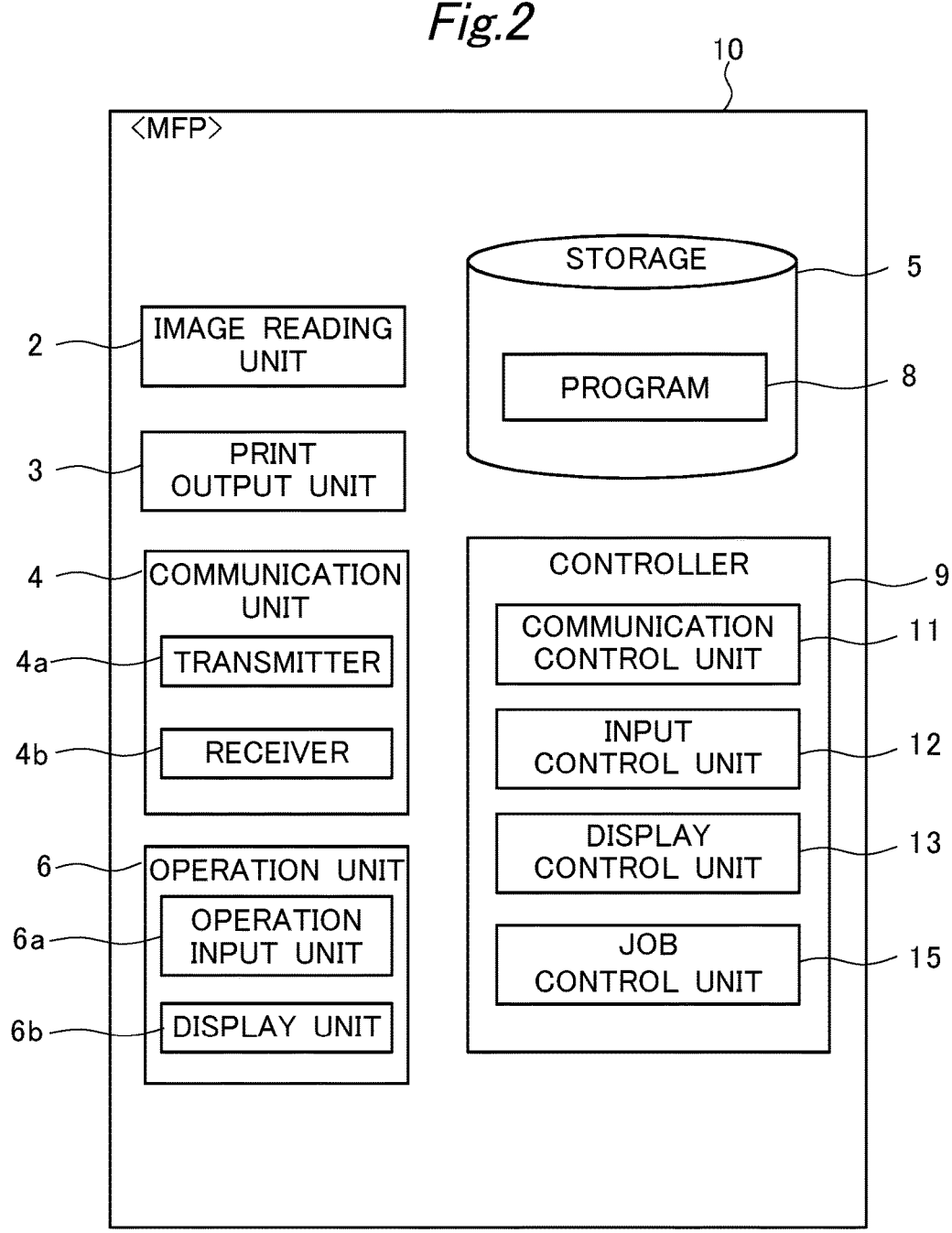
FIG. 2 is a schematic diagram illustrating a configuration of an MFP.

FIG. 2 is a schematic diagram illustrating a configuration of the MFP 10. The MFP 10 is a device (also referred to as a "Multi-Functional Peripheral") that has functions such as a scanner function, a printer function, a copy function, and a data communication function.

The MFP 10 may be an image forming apparatus capable of performing processing such as print output processing (print processing).

As illustrated in FIG. 2, the MFP 10 includes, for example, an image reading unit 2, a print output unit 3, a communication unit 4, a storage 5, an operation unit 6, and a controller 9 and implements various types of functions by operating these constituent elements in combination.

The image reading unit 2 is a processing unit that optically reads an original document placed at a predetermined position on the MFP 10 and generates image data (also referred to as an "original image") of the original document.

The print output unit 3 is an output unit that prints out an image to various medium such as paper on the basis of the image data regarding a target image.

The communication unit 4 is a processing unit capable of facsimile communications via, for example, a public network. The communication unit 4 is also capable of network communications via the network 108. The network communications use various communication protocols such as Transmission Control Protocol/Internet Protocol (TCP/IP) and File transfer Protocol (FTP). Using the network communications allows the MFP 10 to exchange various types of data with desired devices (e.g., gateway 30). The communication unit 4 includes a transmitter 4a that transmits data or other information to other devices, and a receiver 4b that receives data or other information from other devices.

The storage 5 is configured by storage devices such as a hard disk drive (HDD) and a nonvolatile memory.

The operation unit 6 includes an operation input unit 6a that accepts input to the MFP 10, and a display unit 6b that displays and outputs various types of information. The operation unit 6 is also referred to as an "input/output unit."

The controller 9 is a control device that is built into the MFP 10 and performs overall control of the MFP 10. The controller 9 is configured as a computer system that includes, for example, a CPU and various semiconductor memories (e.g., a RAM and a ROM). The controller 9 implements various processing units by causing the CPU to execute a predetermined software program 8 (hereinafter, also simply referred to as a "program") stored in the ROM (e.g., EEPROM (registered trademark)). Note that the program 8 (to be more specific, a group of program modules) may be recorded on a portable recording medium such as a USB memory (in other words, any of various non-transitory computer-readable recording media), read out from the recording medium, and installed into the MFP 10. Alternatively, the program 8 may be downloaded via a network and installed into the MFP 10.

More specifically, as illustrated in FIG. 2, the controller 9 implements various processing units including a communication control unit 11, an input control unit 12, a display control unit 13, and a job control unit 15 by executing the aforementioned program 8.

The communication control unit 11 is a processing unit that controls operations of communication with other devices (e.g., gateway 30) in cooperation with, for example, the communication unit 4. The communication control unit 11 includes a transmission control unit that controls operations of transmitting various types of data, and a reception control unit that controls operations of receiving various types of data.

The input control unit 12 is a control unit that controls operations of operation input to the operation input unit 6a (e.g., touch panel). For example, the input control unit 12 controls operations of accepting operation input (e.g., designation input from a user) to an operation screen displayed on the touch panel.

The display control unit 13 is a processing unit that controls display operations performed in the display unit 6b (e.g., touch panel). The display control unit 13 causes the touch panel to display a screen such as an operation screen for operating the MFP 10.

The job control unit 15 is a processing unit that controls operations (e.g., print output operation) regarding various jobs such as a print job.

3. Configuration of Print Management Server 70

Figure 4:
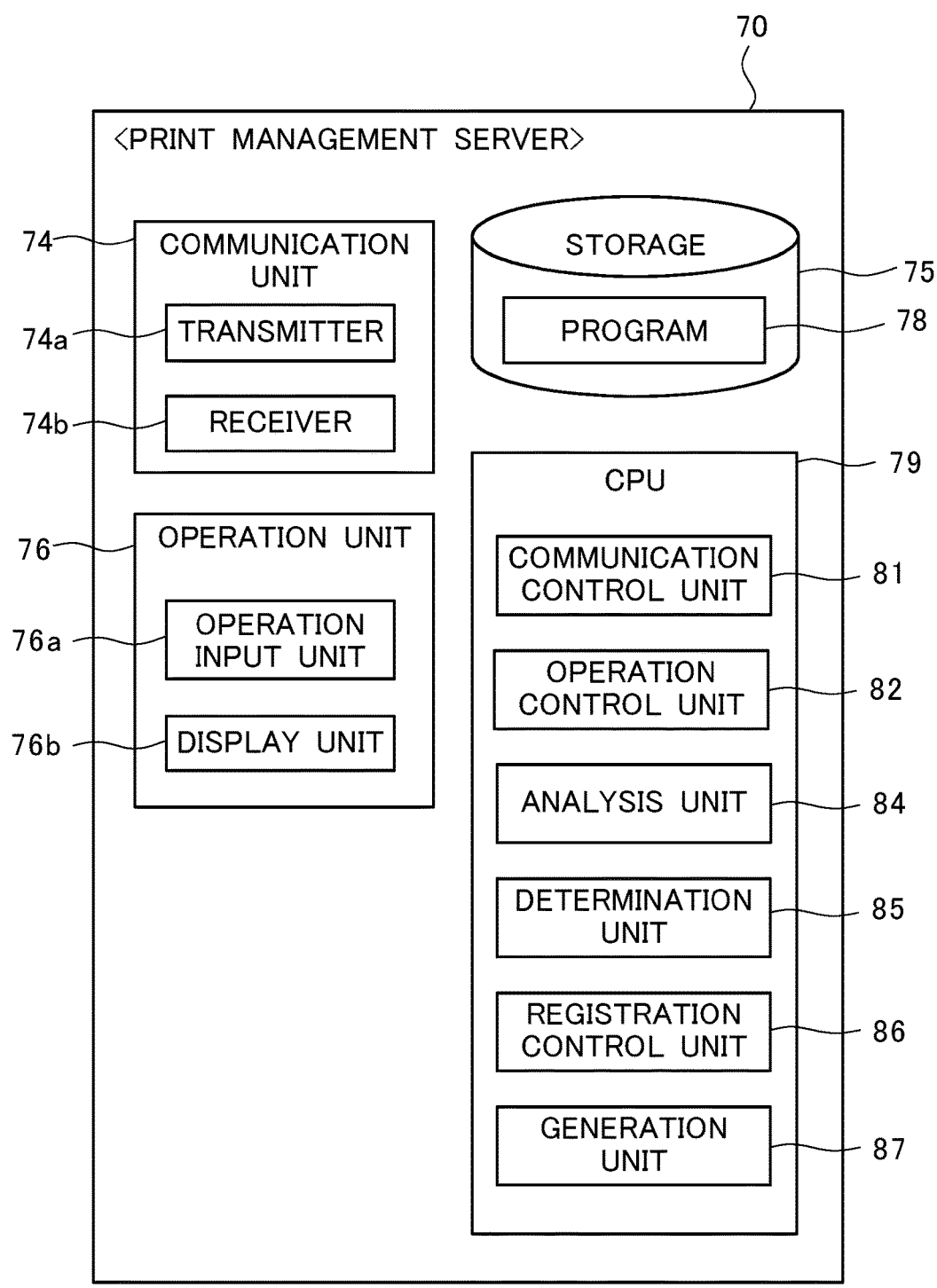
FIG. 4 is a schematic diagram illustrating a configuration of a print management server.

FIG. 4 is a schematic diagram illustrating a configuration of the print management server 70. The print management server 70 is a device that accepts print output instructions from the communication terminals 90 and transmits commands such as a print output command to the MFP 10 via, for example, the gateway 30.

As illustrated in FIG. 4, the print management server 70 includes, for example, a communication unit 74, a storage 75, an operation unit 76, and a CPU 79.

The communication unit 74 is capable of network communications via the network 108. The network communications use various communication protocols such as Transmission Control Protocol/Internet Protocol (TCP/IP) and File transfer Protocol (FTP). Using the network communications allows the MFP to exchange various types of data with desired devices (e.g., gateway 30). The communication unit 74 includes a transmitter 74a that transmits data or other information to other devices, and a receiver 74b that receives data or other information from other devices.

The storage 75 is configured by storage devices such as a hard disk drive (HDD) and a nonvolatile memory.

The operation unit 76 includes an operation input unit 76a that accepts input to the print management server 70, and a display unit 76b that displays and outputs various types of information.

The print management server 70 also includes various processing units including a communication control unit 81, an operation control unit 82, an analysis unit 84, a determination unit 85, a registration control unit 86, and a generation unit 87. More specifically, the print management server 70 implements these various processing units by causing its CPU 79 (FIG. 4) to execute a predetermined program 78 stored in the storage 75 (e.g., HDD). Note that the program 78 may be recorded on, for example, any of various portable recording media such as a DVD-ROM (in other words, any of various non-transitory computer-readable recording media) and installed via the recording medium into the print management server 70. Alternatively, the program 78 may be downloaded via, for example, the network 108 and installed into the print management server 70.

The communication control unit 81 controls various communication operations in cooperation with the communication unit 74 (communication hardware). For example, the communication control unit 81 carries out communications with the communication terminals 90 and receives access requests from the communication terminals 90. The communication control unit 81 also carries out communications with, for example, the gateway 30. The communication unit 74 includes a transmitter 74a that transmits data or other information to other devices, and a receiver 74b that receives data or other information from other devices.

The operation control unit 82 is a processing unit that controls print management operations (including an operation of transmitting a print command to the MFP 10 via the gateway 30) in cooperation with, for example, the communication control unit 81.

The analysis unit 84 analyzes the content of a print output instruction received from a communication terminal 90 and determines the gateway 30 that can relay communications with the print output device (MFP 10) in accordance with the print output instruction. The analysis unit 84 is also referred to as a "relay-device determination unit" that determines the gateway 30 (communication relay device) that is to be used.

The determination unit 85 is a processing unit that determines whether a print target file is present inside the predetermined LAN 109 (the same LAN as that of the print output device (MFP 10) and the gateway 30).

The registration control unit 86 is a processing unit that controls an operation of registering folders listed on an operation screen 310 (see FIG. 27), which will be described later.

The generation unit 87 is a processing unit that generates print job data on the basis of the print target file and a print setting instruction. As will be described later, the print job data is generated by either the print management server 70 (generation unit 87) or the gateway 30 (generation unit 43) in accordance with the print output instruction received from a communication terminal 90.

4. Configuration of Gateway 30

Figure 3:
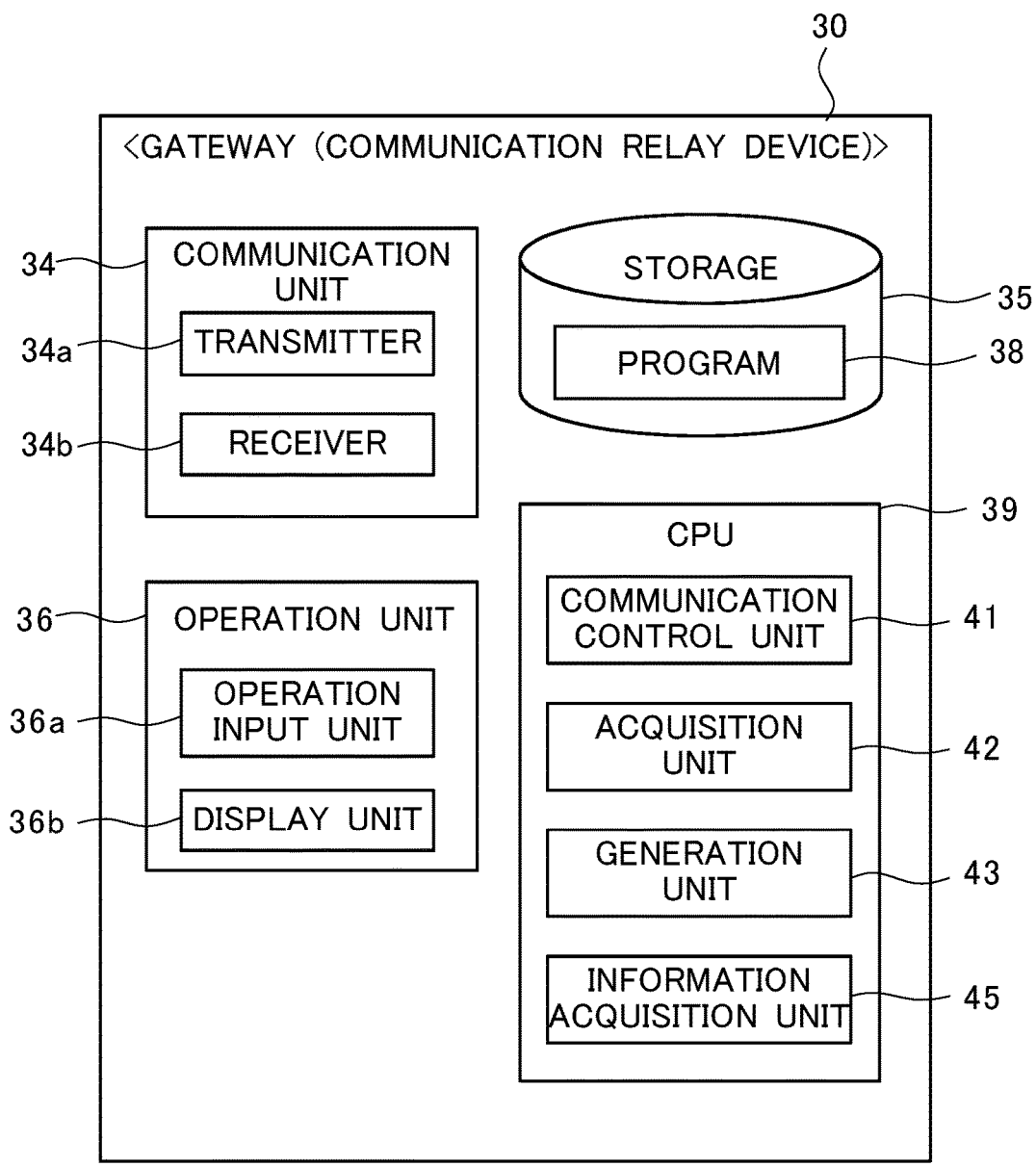
FIG. 3 is a schematic diagram illustrating a configuration of a gateway.

FIG. 3 is a schematic diagram illustrating a configuration of the gateway 30. The gateway 30 is a communication relay device that is provided inside the same LAN (109) as the LAN to which the print output device 10 belongs, and that relays communications with the print output device 10 and the print management server 70.

As illustrated in FIG. 3, the gateway 30 includes, for example, a communication unit 34, a storage 35, an operation unit 36, and a CPU 39.

The communication unit 34 is capable of network communications via the network 108. The network communications use various communication protocols such as a Transmission Control Protocol/Internet Protocol (TCP/IP) and a File transfer Protocol (FTP). Using the network communications allows the MFP 10 to exchange various types of data with desired devices (e.g., the print management server 70 and the MFP 10). The communication unit 34 includes a transmitter 34a that transmits data or other information to other devices, and a receiver 34b that receives data or other information from other devices.

The storage 35 is configured by storage devices such as a hard disk drive (HDD) and a nonvolatile memory.

The operation unit 36 includes an operation input unit 36a that accepts input to the gateway 30, and a display unit 36b that displays and outputs various types of information.

The gateway 30 also includes various processing units including a communication control unit 41, an acquisition unit 42, a generation unit 43, and an information acquisition unit 45 (see FIG. 3). These various processing units are implemented by causing a CPU 39 of the gateway 30 to execute a predetermined program 38. Note that the program 38 may be recorded on any of various portable recording media such as a DVD-ROM (in other words, any of various non-transitory computer-readable recording media) and installed via the recording medium into the gateway 30. Alternatively, the program 38 may be downloaded via, for example, the network 108 and installed into the gateway 30.

The communication control unit 41 is a processing unit that controls communications with other devices.

The acquisition unit 42 is a processing unit that acquires a print target file (to be more specific, data of the print target file). The acquisition unit 42 acquires the print target file from, for example, a communication terminal 90 and the file server 20.

The generation unit 43 is a processing unit that generates print job data on the basis of, for example, the print target file acquired by the acquisition unit 42.

The information acquisition unit 45 is a processing unit that acquires, for example, information about a device (file storage device) that stores the print target file.

5. Outline of Operations

Next, operations performed in the communication system 1 will be described.

When a print output instruction regarding a print target file and a print setting instruction regarding a content of print settings of the print target file are accepted from a communication terminal 90 of a user, the print management server 70 determines whether the print target file is stored in the predetermined LAN 109.

If it is determined that the print target file is not stored in the predetermined LAN 109, a normal operation is performed. More specifically, the print management server 70 itself acquires the print target file and generates print job data on the basis of the print target file and the print setting instruction (see FIGS. 10 and 11, which will be described later). The print management server 70 then transmits the print job data (not a "generation command," which will be described later) to the gateway 30, and the gateway 30 transmits the print job data received from the print management server 70 to the MFP 10. The MFP 10 performs a print output operation on the basis of the print job data.

On the other hand, if it is determined that the print target file is stored in the predetermined LAN 109, the print management server 70 determines that the print target file is not to be acquired by the print management server 70 itself, but to be acquired by the gateway 30 (communication relay device).

The print management server 70 then transmits a generation command (also referred to as a "command to execute data generation processing") to the gateway 30, the generation command being a command to generate print job data on the basis of the print setting instruction and the print target file acquired by the gateway 30. To be more specific, the print management server 70 causes the gateway 30 to acquire the print target file (steps S31 and S67, which will be described later) and also causes the gateway 30 to generate print job data on the basis of the acquired print target file. That is, the print management server 70 causes the gateway 30 to acquire the print target file and generate the print job data, instead of acquiring the print target file (and generating print job data that includes a substantial content of the print target file) by itself. Note that the command to execute data generation processing (generation command) is also referred to as a "preparatory-processing execution command" (command to execute print preparatory processing on the basis of the print setting instruction and the print target file).

The gateway 30 acquires the print target file and generates print job data on the basis of the print target file and the print setting instruction. The gateway 30 then transmits the generated print job data to the MFP 10 (print output device).

In response to this, the MFP 10 performs a print output operation on the basis of the print job data.

In the present embodiment, the print output instruction is given using a communication terminal 90 (e.g., 90a or 90b). In particular, two types of modes M1 and M2 are used as a technique for designating a print target file. Note that a technique for designating the content of print settings is common to the two types of modes M1 and M2.

The first mode M1 is a mode in which data of the print target file is transmitted and received via a communication terminal 90, and the second mode M2 is a mode in which data of the print target file is transmitted and received without the intervention of a communication terminal 90.

In the first mode M1, a print output instruction is given using an operation screen 210 as illustrated in FIG. 23 (and FIG. 24). The first mode M1 is used in the case of printing out a file (print target file) that is actually present inside a communication terminal 90 and in the case of printing out a file that is temporality acquired by a communication terminal 90 (i.e., file that is temporality present inside the communication terminal 90). In the first mode M1, the operation of transmitting and receiving data of the print target file is implemented via a communication terminal 90.

In the second mode M2, a print output instruction is given using an operation screen 310 as illustrated in FIG. 27 (and FIG. 28). The second mode M2 is used in the case of printing out a file (print target file) that is present outside a communication terminal 90. To be more specific, the second mode M2 is used in the case of printing out, for example, a file that is stored in a server device (e.g., file server 20) inside the LAN 109 or a file that is stored in a server device (e.g., print management server 70) outside the LAN 109. In the second mode M2, the operation of transmitting and receiving data itself of the print target file is implemented without the intervention of a communication terminal 90.

In the first mode M1, whether the print target file is present inside the LAN 109 is determined on condition that the communication terminal 90 is present inside the LAN 109. In the second mode M2, whether the print target file is present inside the LAN 109 is determined on condition that the storage location of the print target file specified on the basis of designation of a file path from the communication terminal 90 is a storage device inside the LAN 109.

Then, as described above, if it is determined that the print target file is stored in the LAN 109, the print target file is acquired by the gateway 30 (communication relay device), and print job data is generated by the gateway 30. On the other hand, if it is determined that the print target file is not stored in the LAN 109, the print target file is acquired by the print management server 70 itself, and print job data is generated by the print management server 70 itself.

6. Details of Operations

Figure 17:
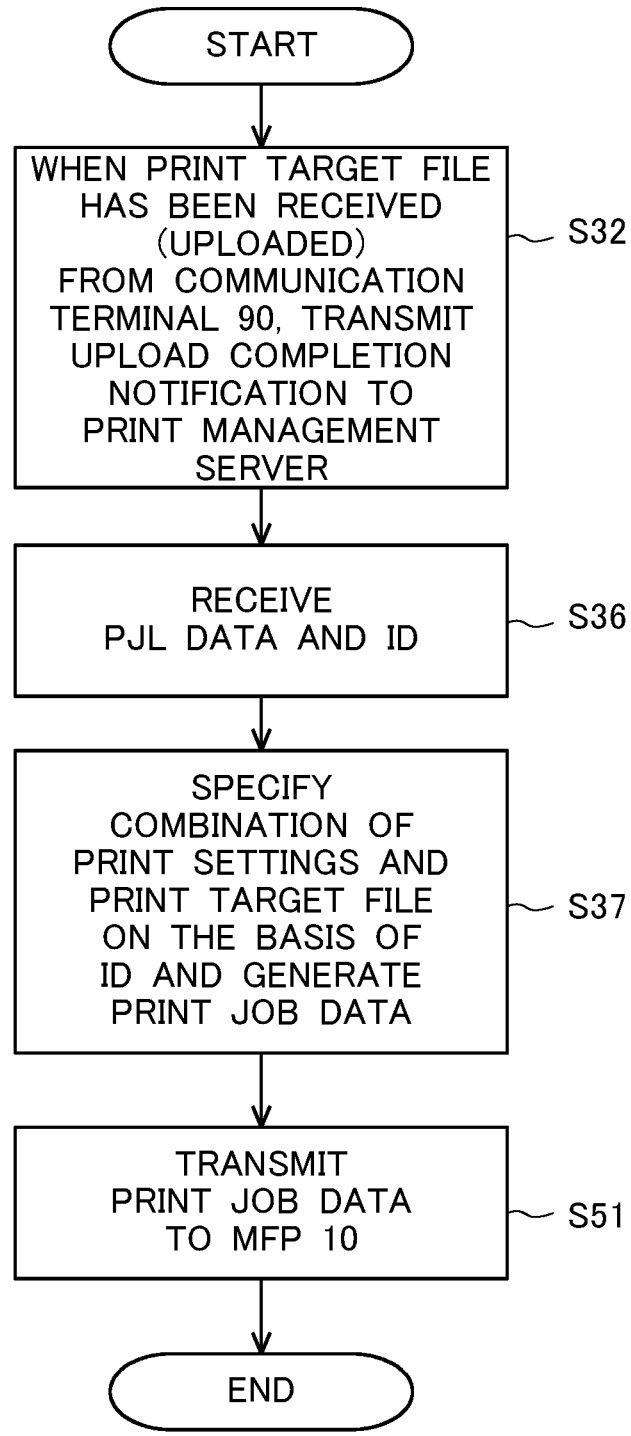
FIG. 17 is a flowchart of the operation of the gateway (communication relay device).
Figure 18:
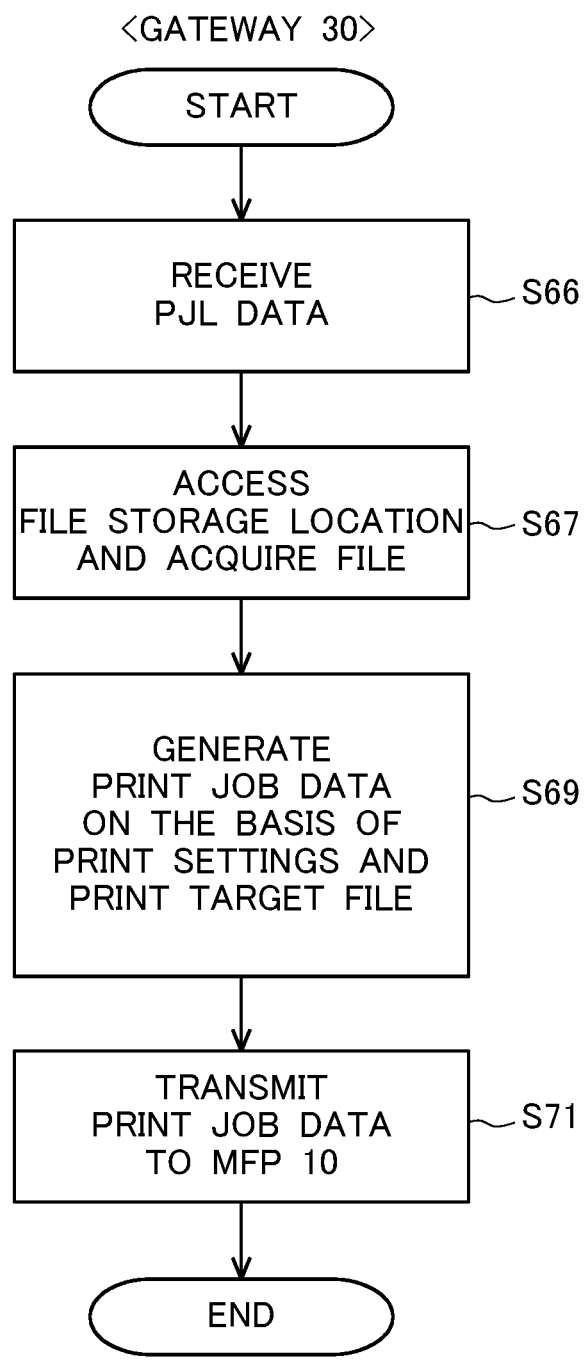
FIG. 18 is a flowchart of the operation of the gateway (communication relay device).

The following is a detailed description of the aforementioned operations with reference to, for example, FIGS. 12 to 18. FIGS. 12 to 16 are flowcharts illustrating operations of the print management server 70, and FIGS. 17 and 18 are flowcharts illustrating operations of the gateway 30.

Figure 12:
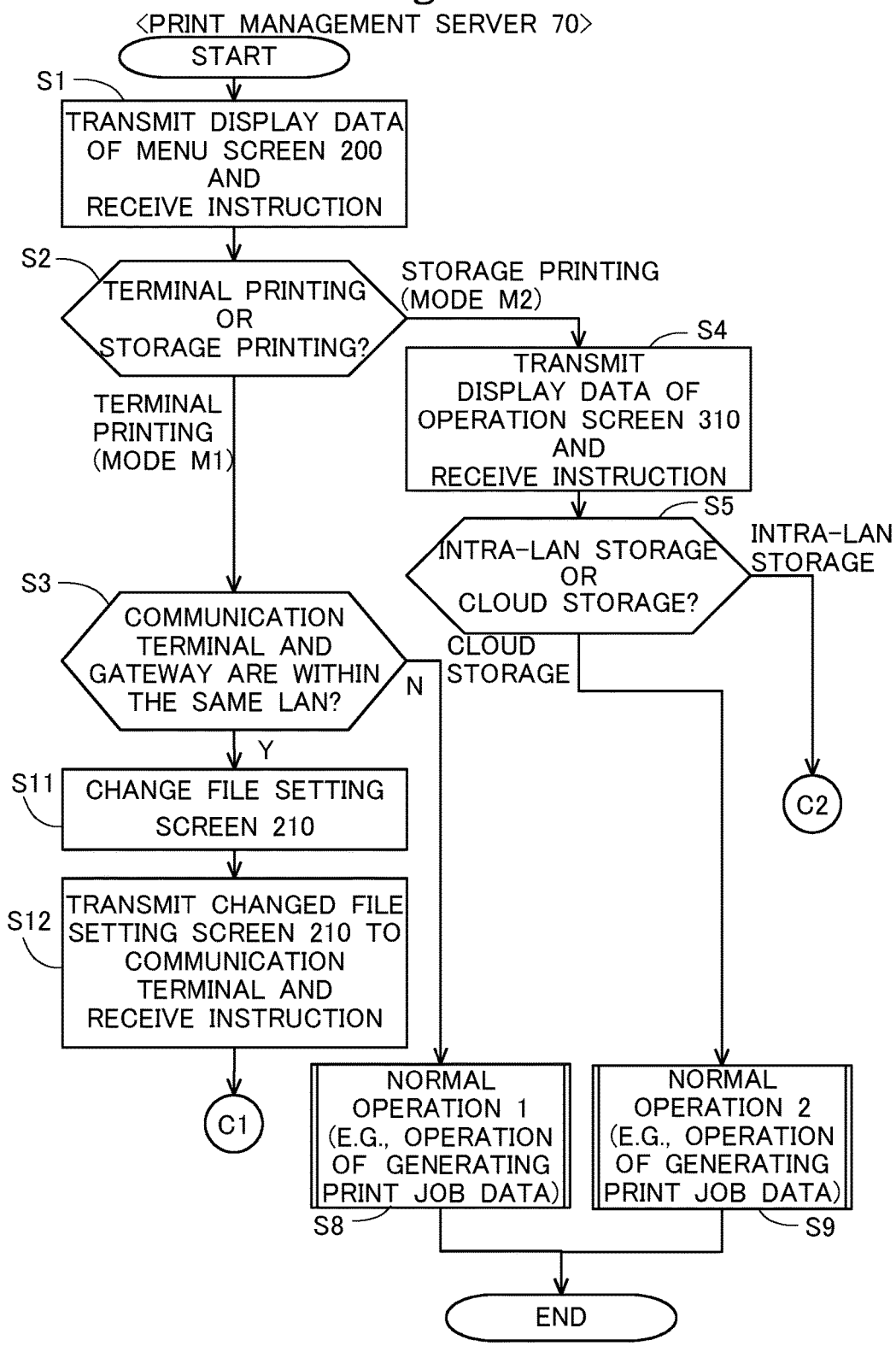
FIG. 12 is a flowchart of the operation of a print management server.
Figure 13:
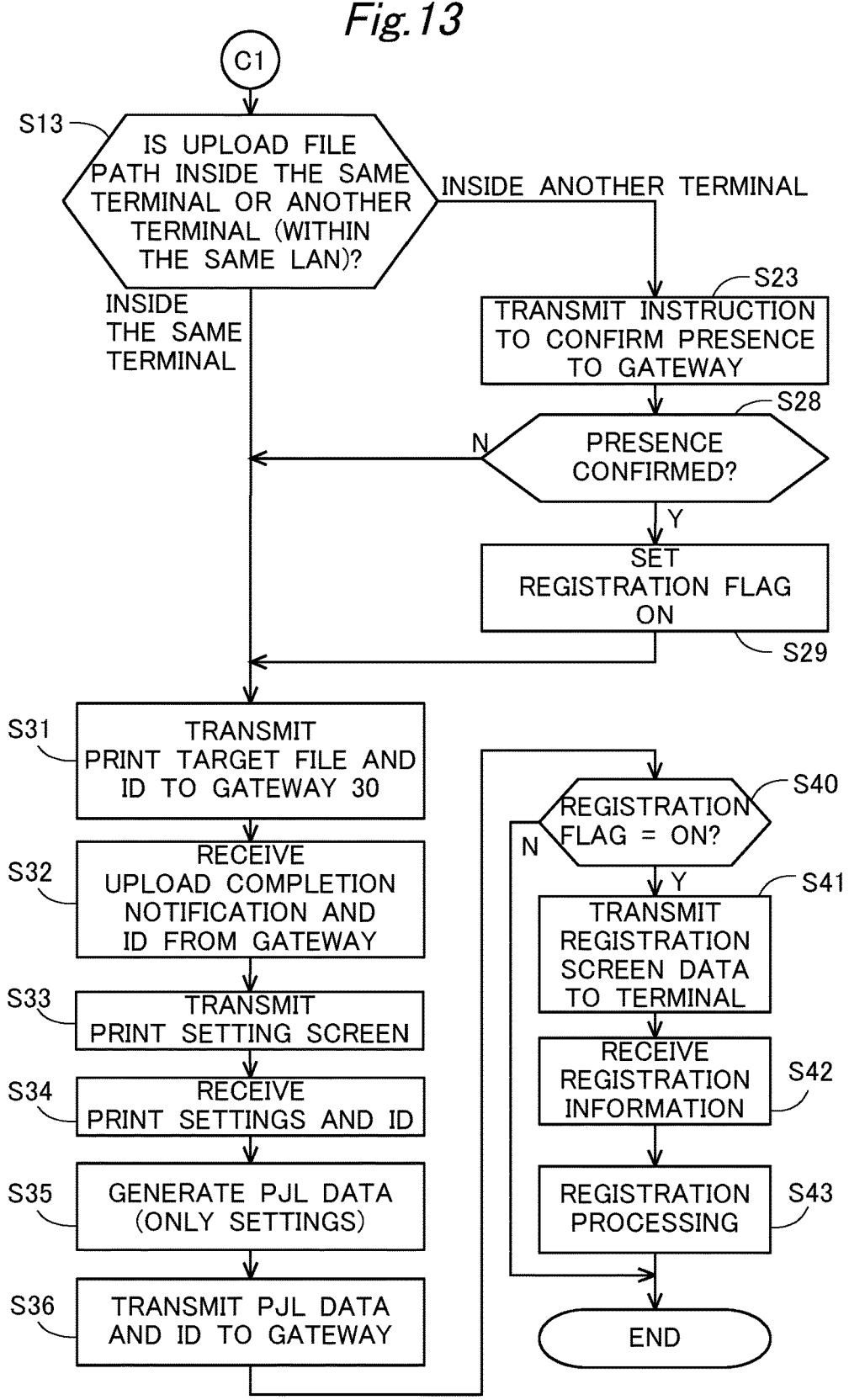
FIG. 13 is a flowchart of the operation of the print management server.

First, when a communication terminal 90 accesses a predetermined address in the print management server 70 (transmits a hypertext transfer protocol (HTTP) request) by using a web browser of the communication terminal 90, the print management server 70 transmits display data (HTTP response) to the communication terminal 90 (step S1 in FIG. 12). Upon receiving the display data, the communication terminal 90 displays an operation screen 200 (FIG. 22) on the basis of the display data. The user of the communication terminal 90 uses this operation screen (menu screen) 200 to select a desired mode out of the two modes M1 and M2. The mode M1 is selected by the press of a button 201 on the left, whereas the mode M2 is selected by the press of a button 202 on the right. Note that the operation screen 200 is also referred to as a "mode selection screen" for selecting the desired mode.

In step S2, branch processing in accordance with the selected mode is performed.

When the mode M1 is selected (i.e., a mode in which data of the print target file is transmitted and received via a communication terminal 90), the procedure proceeds from step S2 to step S3.

When the mode M2 is selected (i.e., a mode in which the data of the print target file is transmitted and received without the intervention of a communication terminal 90), the procedure proceeds from step S2 to step S4.

When the mode M1 is selected, the operation screen 210 (see, for example, FIG. 23) is displayed on a communication terminal 90 to designate a print target file. On the other hand, when the mode M2 is selected, the operation screen 310 (see, for example, FIG. 27) is displayed on a communication terminal 90 to designate a print target file. In other words, the communication terminals 90 are capable of selectively displaying a plurality of operation screens, which includes the operation screens 210 and 310, to accept designation of the print target file. Note that each operation screen is displayed on the basis of display data (e.g., hypertext markup language (HTML) data) that is transmitted from the print management server 70 to the communication terminal 90.

Operations in Mode M2

Figure 8:
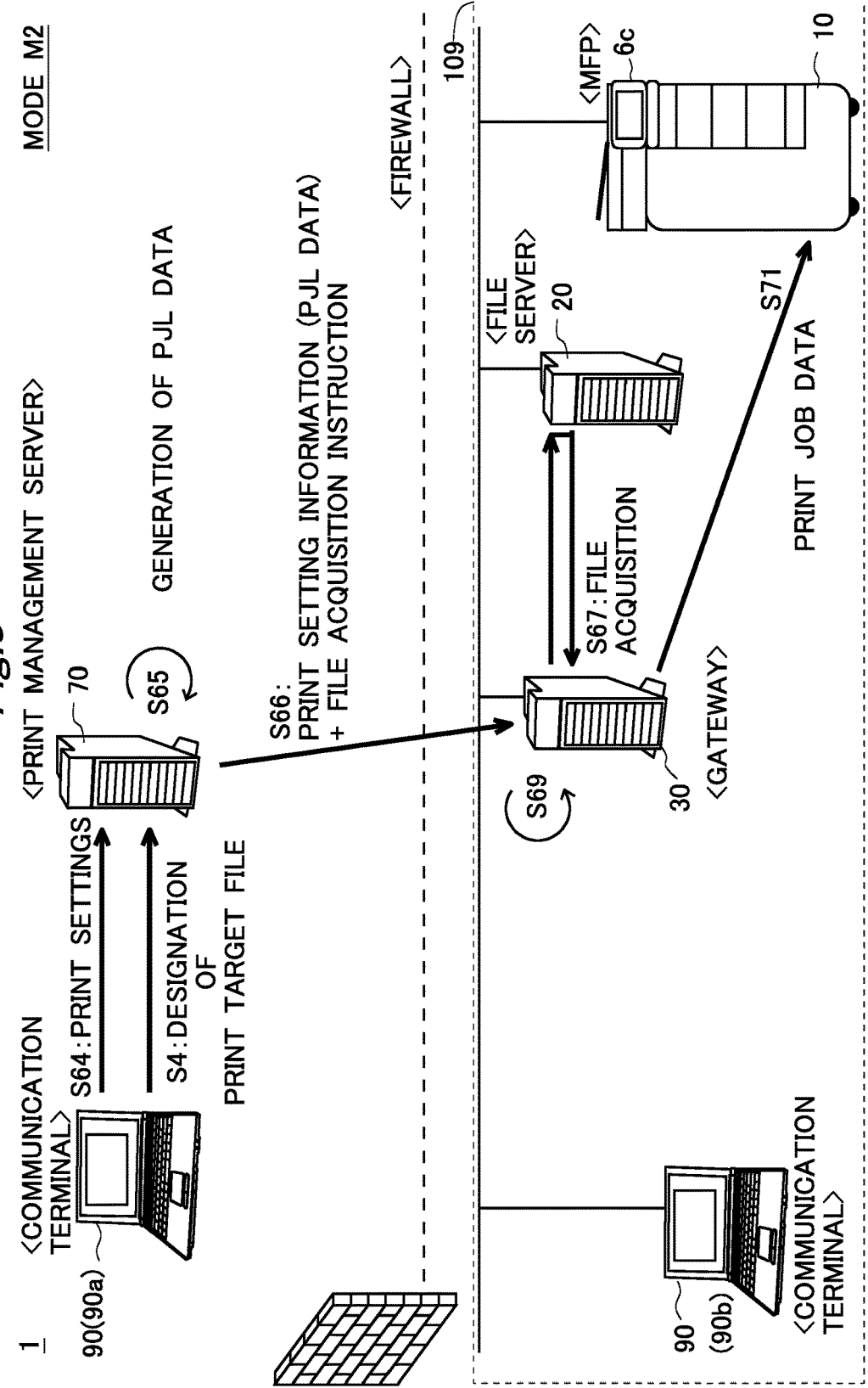
FIG. 8 is a conceptual diagram illustrating an operation in a mode M2.

First, the case where the mode M2 is selected will be described below with reference to, for example, FIGS. 8 and 21. FIG. 8 is a conceptual diagram illustrating operations performed in the mode M2 when a file stored in the LAN 109 is designated as a print target file. FIG. 21 is a timing chart of these operations.

In step S4, the print management server 70 transmits display data for display of the next operation screen 310 (see FIG. 27) to the communication terminal 90, and the communication terminal 90 displays the operation screen 310 (see FIG. 27) on the basis of the display data. The operation screen 310 is a screen (print-target-file designation screen) for designating a print target file by using a folder path that is registered in advance.

The left part of the operation screen 310 is a folder-list display area 311, and the central and right parts of the operation screen 310 is a file-list display area 312. The folder-list display area 311 shows a list of a plurality of accessible folders. The plurality of folders include cloud folders (folders indicating storage areas in cloud servers) such as a cloud storage R1 and a cloud storage R2, and intra-LAN folders such as an intra-LAN folder F1. Each folder is displayed on the operation screen 310 as a result of the user performing, for example, a prior registration operation on the print management server 70.

When one folder is selected from among the plurality of folders in the folder-list display area 311, one or a plurality of files stored in the selected one folder (selected folder) is listed in the file-list display area 312. For example, when the "cloud storage R1" in the folder-list display area 311 is selected as illustrated in the operation screen 310(310a) in FIG. 27, five files 321 to 325 stored in this "cloud storage R1" are listed in the file-list display area 312. Similarly, when the "intra-LAN folder F1" in the folder-list display area 311 is selected as illustrated in the operation screen 310(310b) in FIG. 28, two files 331 and 332 stored in the "intra-LAN folder F1" are listed in the file-list display area 312.

The user designates a print target file by using the operation screen 310. For example, the user may designate the file 321 ("abcdef.doc") stored in the "cloud storage R1" as a print target file by checking a checkbox on the left side of the file 321 (e.g., with a mouse-click) on the operation screen 310a in FIG. 27. Similarly, the user may designate the file 331 ("efg.doc") stored in the "intra-LAN folder F1" by checking a checkbox on the left side of the file 331 with a touch of the operation screen 310b in FIG. 28.

When the user has designated a print target file by using the operation screen 310, the content of the instruction (e.g., a file name and a folder path name of the print target file) is transmitted from the communication terminal 90 to the print management server 70. In response to this, the print management server 70 receives a user instruction (i.e., the content of the designation regarding the print target file) that is given using the operation screen 310.

In step S5, it is determined whether the print target file is present inside the predetermined LAN 109. The determination as to whether the print target file is present inside the predetermined LAN 109 may be made on the basis of the content of the designation on the operation screen 310. To be more specific, when an intra-LAN folder is designated as a storage folder of the print target file on the operation screen 310, it may be determined that the print target file is present inside the predetermined LAN 109. When a cloud server folder is designated as a storage folder of the print target file, it may be determined that the print target file is not present inside the predetermined LAN 109.

The determination as to whether the storage folder of the print target file is a folder inside the LAN (inside the same LAN as that of the MFP 10) may be made on the basis of settings (settings as to whether the storage folder is present inside the same LAN as that of the MFP 10) that are explicitly instructed by the user at the time of registering the folder in the operation screen 310. Alternatively, as will be described later with reference to, for example, FIGS. 7 and 20, the print management server 70 may determine this matter (i.e., whether the storage folder of the print target file is an intra-LAN folder) on the basis of information acquired via the gateway 30. In particular, this matter may be determined on the basis of, for example, the presence or absence of information (information indicating that the storage folder is an intra-LAN folder, i.e., a folder inside the same LAN as that of the MFP 10) that is registered as a "folder path that can be used with the operation screen 310 in the mode M2" in response to, for example, the press of an approval button 413 in the mode M1, which will be described later, at the same time when the storage folder is registered.

If the print target file is a file stored in a cloud storage (e.g., print management server 70), it is determined that the print target file is not present inside the predetermined LAN 109, and the procedure proceeds from step S5 to step S9.

Figure 11:
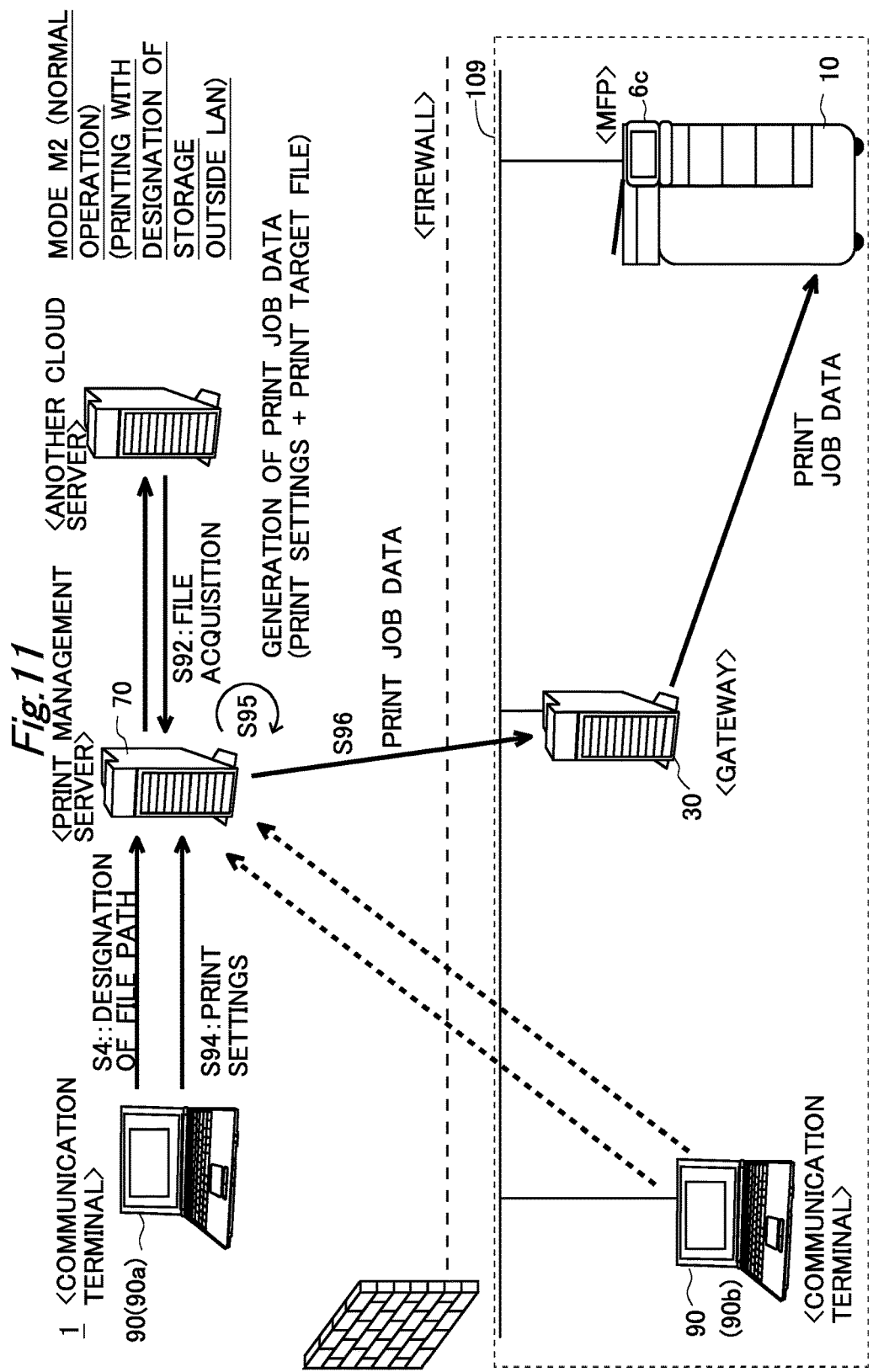
FIG. 11 illustrates that a print output operation is performed by designating a storage outside the LAN in the mode M2.

In step S9 (see also FIG. 16), a normal operation is performed. More specifically, the print management server 70 accesses the cloud server (e.g., print management server 70 itself or another cloud server) to acquire the print target file (step S92 and see also FIG. 11). FIG. 11 illustrates a state in which a print output operation is performed in the mode M2 by designating a storage (another cloud server in FIG. 11) outside the LAN 109. The print management server 70 also transmits display data for display of the operation screen for designating the content of print settings to the communication terminal 90 (step S93) and acquires (receives) print setting information that is input using the operation screen, from the communication terminal 90 (step S94). The print management server 70 further generates printer job language (PJL) data, which will be described later, on the basis of the print setting information and generates print job data by combining the PJL data with the print target file (step S95). Then, the print management server 70 transmits the print job data to the gateway 30 (step S96), and the gateway 30 transmits (transfers) the print job data to the MFP 10. The MFP 10 performs print output processing (and also performs other processing such as rasterization) on the basis of the received print job data. In this way, the print management server 70 performs processing such as generating print job data.

Figure 14:
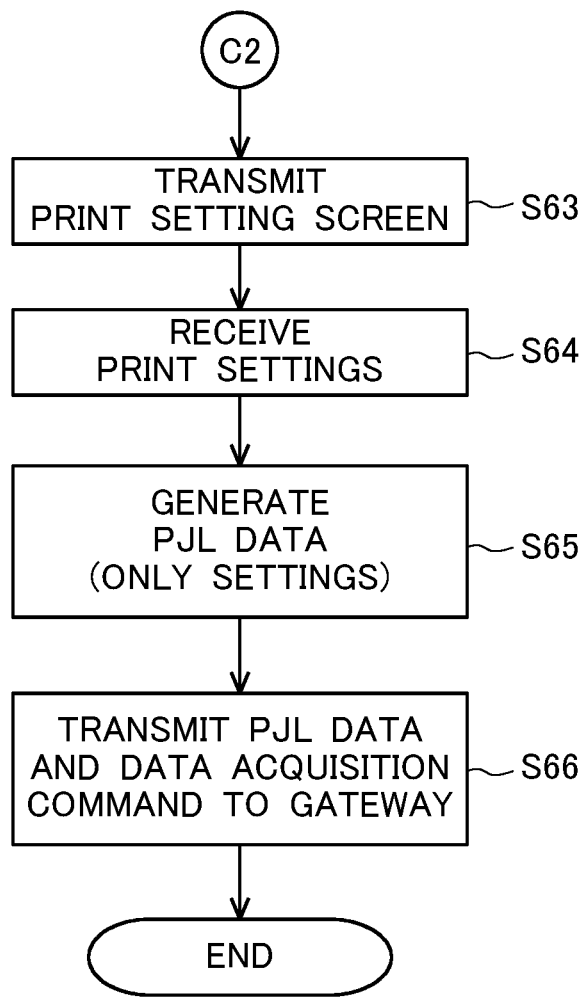
FIG. 14 is a flowchart of the operation of the print management server.
Figure 15:
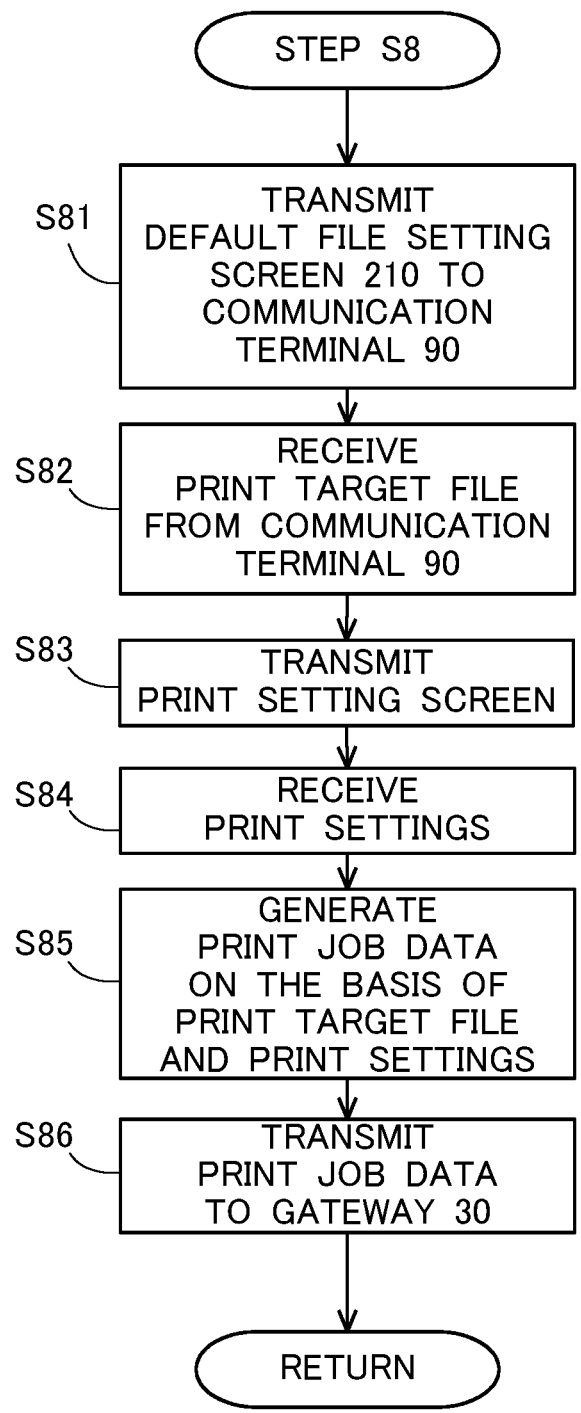
FIG. 15 is a flowchart of the operation performed in step S8.
Figure 16:
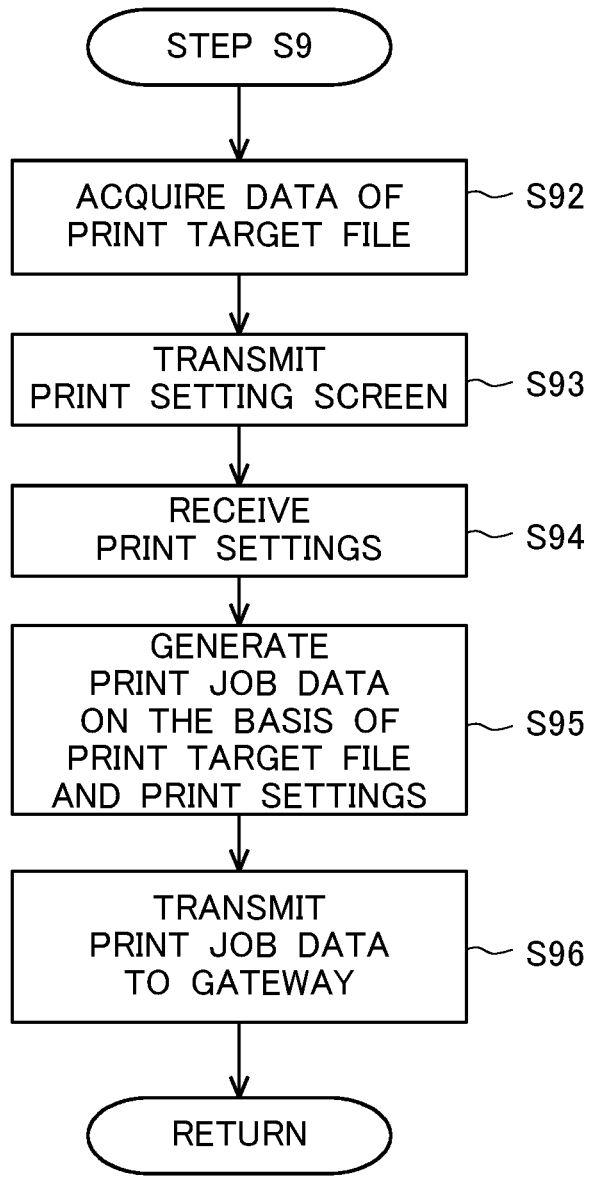
FIG. 16 is a flowchart of the operation performed in step S9.

On the other hand, if the print target file is a file stored in an intra-LAN storage (e.g., file server 20), the procedure proceeds from step S5 (FIG. 12) to step S63 (FIG. 14). In other words, if the storage location of the print target file is a storage device inside the predetermined LAN 109, it is determined that the print target file is present inside the predetermined LAN 109, and the procedure proceeds to step S63.

In step S63, upon receiving a request to display the next operation screen (here, a print setting screen) from the communication terminal 90, the print management server 70 transmits display data for display of a print setting screen (not shown) to the communication terminal 90 in response to the display request. The communication terminal 90 displays the print setting screen on the basis of the display data and accepts a print setting operation from the user. The user makes various print settings (settings such as "paper size" and "double-sided/single-sided") and then presses a print execution button (not shown).

In response to the operation of pressing the print execution button, the communication terminal 90 transmits the content of the print settings (print setting information) to the print management server 70 (step S64).

When the print management server 70 has received the content of the print settings and the information regarding the designation of the print target file, the procedure proceeds to step S65.

In step S65, the print management server 70 generates printer job language (PJL) data on the basis of the received content of the print settings. This PJL data is data describing the print settings or other information. The PJL data does not include substantial data of the print target file.

In the next step S66 (see also FIGS. 8 and 21, for example), the print management server 70 transmits the PJL data to the gateway 30. The print management server 70 also transmits a command to acquire the print target file and information regarding the designation of the print target file to the gateway 30. Note that the command to acquire the print target file and the information also function as a "generation command" to generate print job data.

Here, the command to acquire the print target file and the information regarding the designation of the print target file may be given to the gateway 30 on the basis of, for example, a description as illustrated in FIG. 30. More specifically, the designation of a file path of the print target file ("Doc Path: ¥¥server¥ . . . ¥ . . . ¥folder2¥efg.doc") may be described in the header of the data (hypertext transfer protocol (HTTP) data) transmitted from the print management server 70 to the gateway 30. In this case, the file acquisition command and the file designation information can be described (given) relatively easily. Note that the aforementioned PJL data may be described in the body of the HTTP data.

In step S67 (see also FIG. 18), the gateway 30 accesses the storage location (here, file server 20) described in the information regarding the designation of the print target file and acquires data of the print target file. In this way, the gateway 30 actively acquires the print target file. FIG. 18 is a flowchart of operations performed by the gateway 30, and to be more specific, illustrates operations performed in the case where the gateway 30 has received a command to acquire the print target file from the print management server 70.

Then, in step S69, the gateway 30 generates print job data on the basis of the print target file (to be more specific, data of the print target file) acquired from the storage location of the print target file and the PJL data transmitted from the print management server 70. To be more specific, the gateway 30 generates print job data by combining the data of the print target file and the data of the PJL data.

In step S71, the gateway 30 transmits the print job data to the MFP 10. On the basis of the received print job data, the MFP 10 prints out the designated print target file in accordance with the designated content of the print settings.

In this way, the gateway 30 performs processing such as generating print job data.

Figure 32:
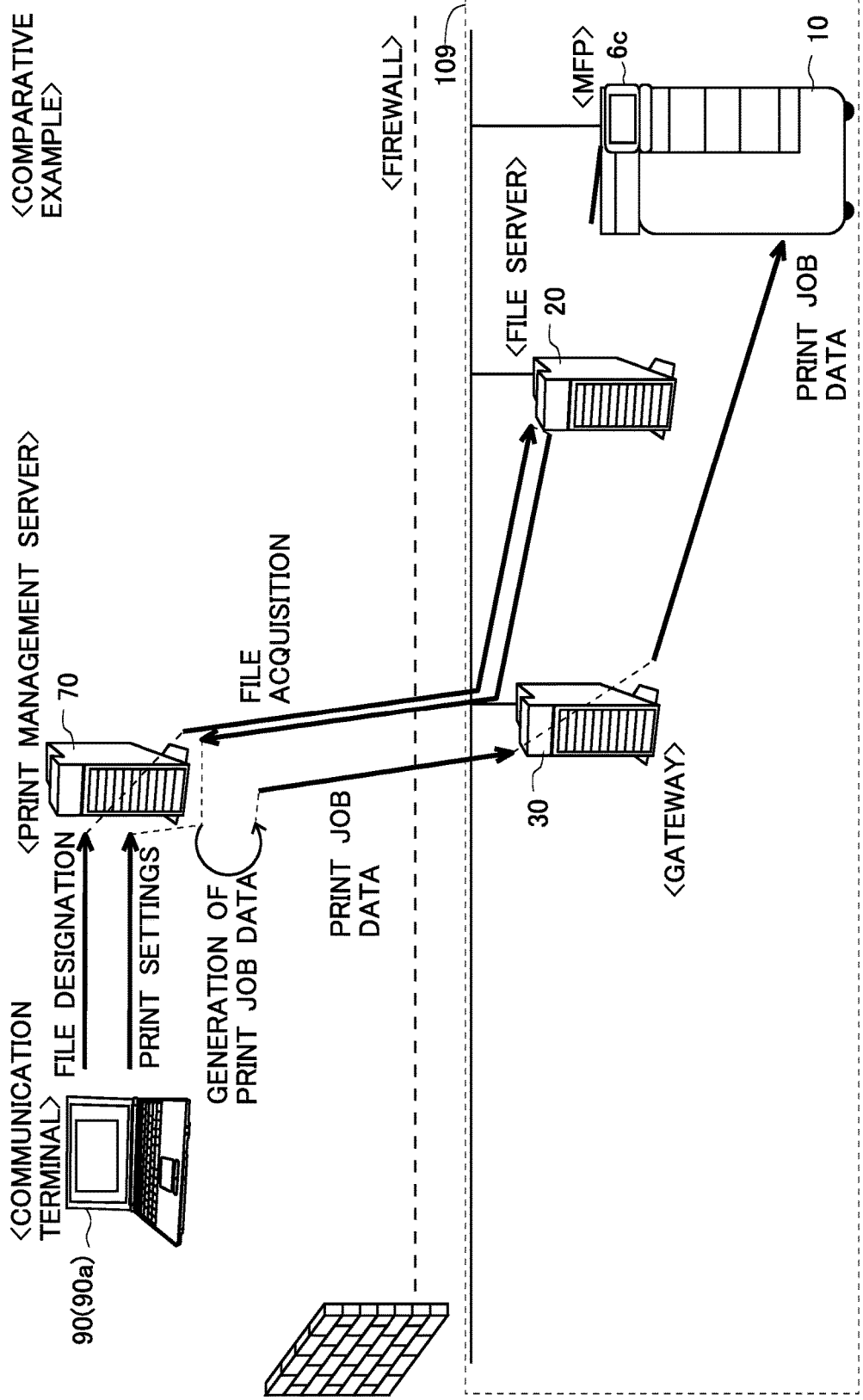
FIG. 32 is a conceptual diagram illustrating an operation according to another comparative example.

In particular, the print management server 70 does not perform the processing of acquiring the print target file (to be more specific, data of the print target file), and the gateway 30 performs the processing of acquiring the print target file. Then, the gateway 30 generates print job data on the basis of the print target file and other information. In this case, the print target file only needs to be transmitted from the file server 20 directly to the gateway 30. In short, the print target file is transmitted and received only within the LAN 109 and not transmitted to the outside (e.g., print management server 70) of the LAN 109. This will considerably suppress an increase in communication load, as compared with the case where the data of the print target file is transmitted from the file server 20 to the print management server 70 and then substantially transmitted from the print management server 70 to the gateway 30 as illustrated in FIG. 32. Because communications are completed only within the LAN 109, the risk of information leakage can be more reduced than in the case where the print target file is transmitted to the outside of the LAN 109.

Besides, in the case of designating and printing out a print target file, there is no need to change operations depending on whether the print target file is stored in the LAN or stored outside the LAN (e.g., cloud server). That is, the user is able to print out a print target file through similar operations using the same operation screen 310, irrespective of the storage location of the print target file.

Figure 9:
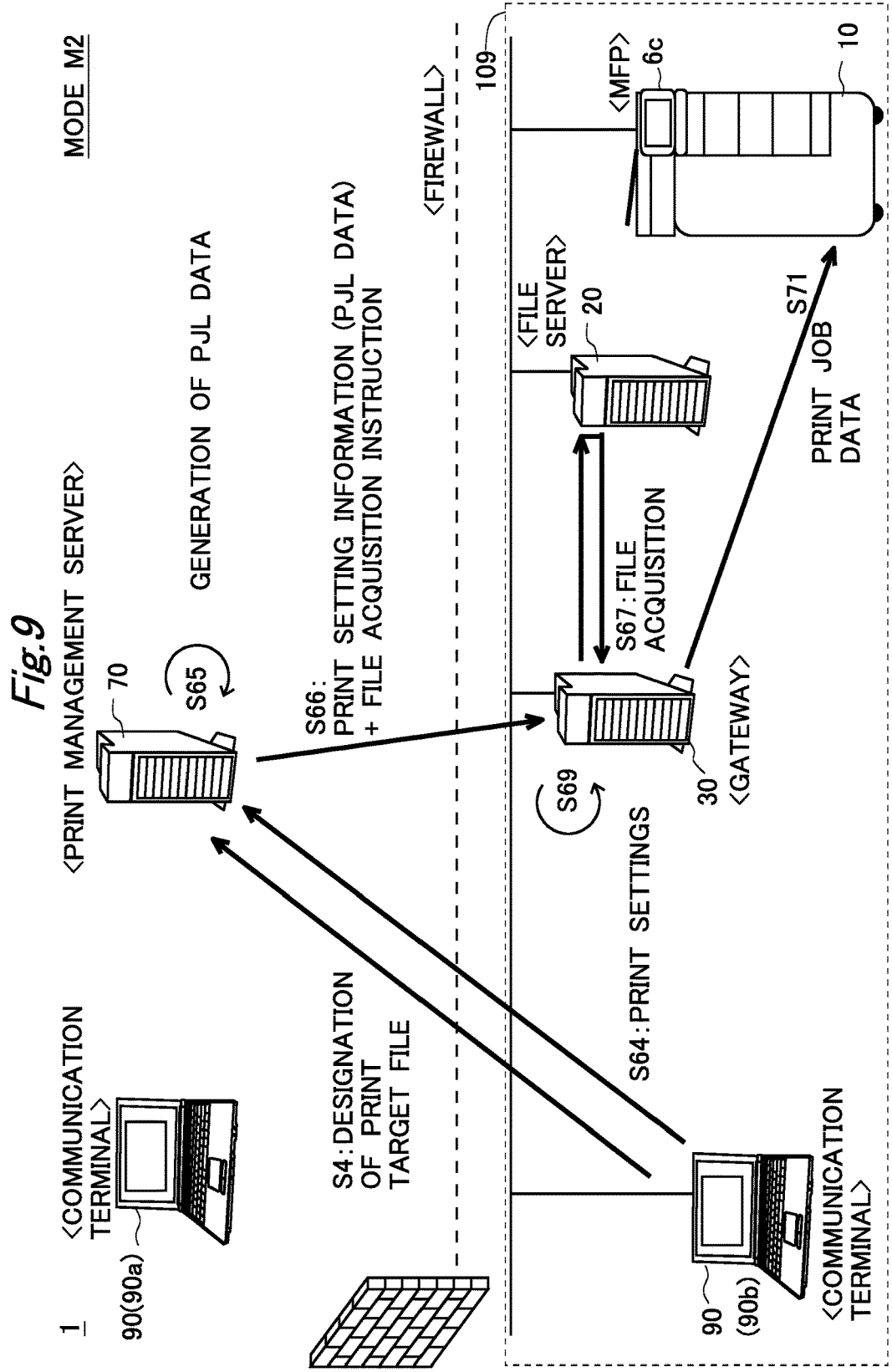
FIG. 9 illustrates an operation similar to that in FIG. 8 (however, when the communication terminal is present inside the LAN).

While in the example in FIG. 8, the communication terminals 90 is present outside the LAN 109, the present invention is not limited to this example. Similar processing may be performed even if the communication terminal 90 is present inside the LAN 109 (see FIG. 9). FIG. 9 illustrates a state in which operations similar to those in FIG. 8 are performed when the communication terminal 90 is present inside the LAN 109.

Operations in Mode M1 (Part 1)

Figure 5:
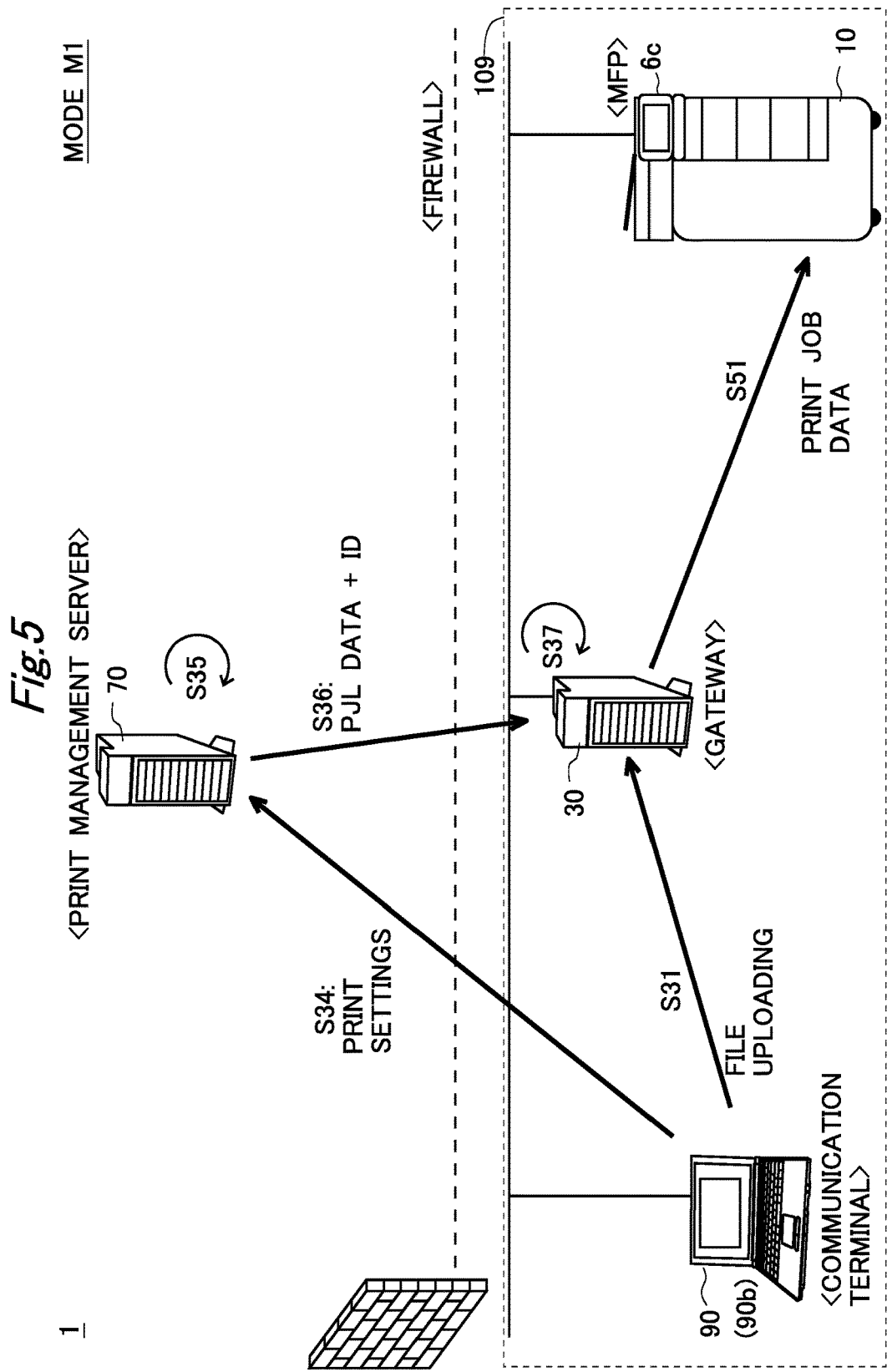
FIG. 5 is a conceptual diagram illustrating an operation in a mode M1 (file printing operation inside a communication terminal).
Figure 19:
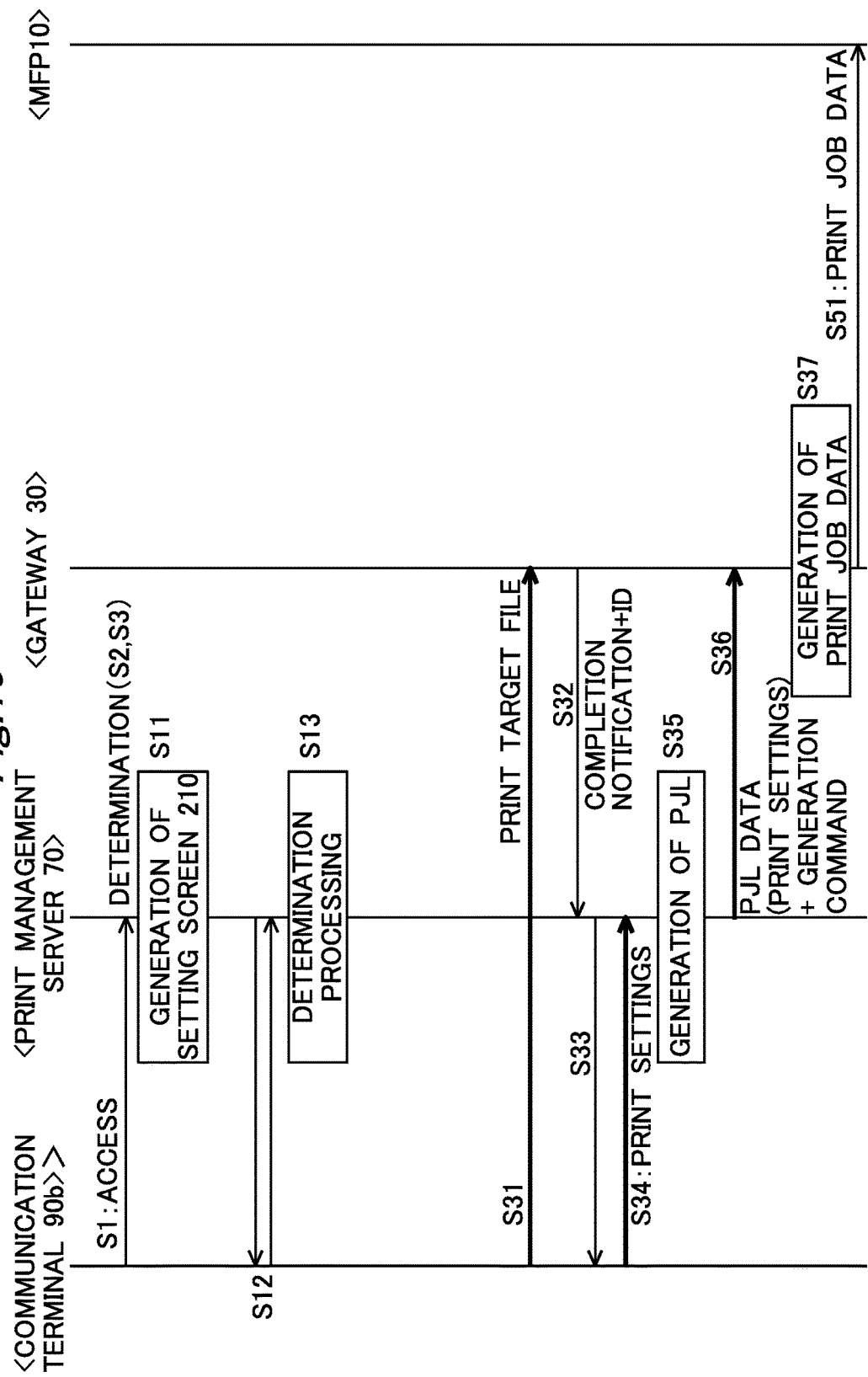
FIG. 19 is a timing chart of the operation in FIG. 5.

Next, a case where the mode M1 is selected (i.e., a mode in which the data of the print target file is transmitted and received via a communication terminal 90) will be described with reference to, for example, FIGS. 5 and 19. FIG. 5 is a conceptual diagram illustrating operations performed in the mode M1 when a file that is stored in a communication terminal 90 inside the LAN 109 is uploaded from the communication terminal 90 and printed out. FIG. 19 is a timing chart of these operations.

In the mode M1 (mode in which the data of the print target file is transmitted and received via a communication terminal 90), it is possible to print out a file that is (already) stored in a communication terminal and to print out a file that is stored outside the communication terminal. In the case of printing out a file that is stored outside a communication terminal, the communication terminal 90 accesses the storage location of the file (storage location designated at the communication terminal 90 using the operation screen 210, which will be described later), acquires the file (to be more specific, data of the file) (i.e., temporarily stores the file in the communication terminal 90), and then transmits (transfers) the acquired file as a print target file to a transmission destination device.

Below, the case of printing out a file that is (already) stored in a communication terminal will be mainly described.

When the mode M1 is selected, it is determined that the data of the print target file is transmitted and received via a communication terminal 90 (while at least temporarily stored in the communication terminal 90), and the procedure proceeds from step S2 (FIG. 12) to step S3.

In step S3, the print management server 70 acquires the IP address of the communication terminal 90 on the basis of the HTTP request received in step S1. The print management server 70 then compares the IP address of the communication terminal 90 with the IP address of the MFP 10 (or the IP address of the gateway 30) and determines whether the communication terminal 90 is present inside the same network (same LAN) as the LAN to which the MFP 10 belongs. It is assumed here that the print output device (MFP 10) has already been designated, and the print management server 70 has already known the IP address of the MFP 10 and the IP address of the gateway 30 corresponding to the MFP 10.

If it is determined that the communication terminal 90 is not present inside the same LAN as that of the MFP 10, the procedure proceeds from step S3 to step S8. Step S8 will be described later.

On the other hand, if it is determined that the communication terminal 90 is present inside the same LAN as that of the MFP 10, the procedure proceeds from step S3 to step S11. In other words, when it is determined (in steps S2 and S3) that the communication terminal 90 is present inside the LAN 109 and the print target file is transmitted via the communication terminal 90, it is determined that the print target file is present inside the predetermined LAN 109, and the procedure proceeds to step S11.

In step S11, the print management server 70 generates display data for display of the next operation screen 210 (see FIG. 23). Then, in step S12, the print management server 70 transmits the generated display data to the communication terminal 90. In the communication terminal 90, the operation screen 210 is displayed on the basis of the display data (see FIG. 23). The operation screen 210 is a screen for designating a print target file along with a folder path of the print target file in order to transmit the print target file via the communication terminal 90.

Here, the communication terminal 90 stores default operation screen data of the operation screen 210 (default display data for display of the operation screen 210) in advance. In step S11, however, processing for changing the address of a transmission destination server to which the print target file is transmitted is performed on this default operation screen data (display data for display of the operation screen 210). FIG. 25 illustrates the default operation screen data (display data before change), and FIG. 26 illustrates the changed operation screen data (display data after change). In FIG. 25, a part P1 describes that the print target file is to be transmitted to the transmission destination before change ("cloudabc.com"), i.e., the address indicating the print management server 70. On the other hand, the part P1 in FIG. 26 describes that the print target file is to be transmitted to the changed transmission destination ("gwaddress.com"), i.e., the address indicating the gateway 30. By executing the script described in the part P1 in response to the operation of pressing the button 213 as will be described later, the print target file designated in the file-path designation field 212 is transmitted to the gateway 30, instead of the print management server 70.

In the first mode M1, the user of the communication terminal 90 gives a print output instruction by using the operation screen 210 illustrated in FIG. 23 (step S12).

FIG. 23 illustrates a state in which a file named "abc.doc" and stored in a predetermined folder of the communication terminal 90 is designated as the print target file. For example, the user may designate the print target file by pressing a file selection button 211 to cause another file-tree screen to be displayed and then selecting a desired file on the file-tree screen. In response to such a designation operation, the name (including the folder path) of the designated print target file is displayed in the file-path designation field 212. Alternatively, the user may designate the print target file by directly inputting the folder path and the file name in the file-path designation field 212.

The user who has designated the print target file in this way then presses an upload button 213 (step S12).

Following the operation of designating the print target file, the content of the designation of the print target file (content designated in the file-path designation field 212) is transmitted from the communication terminal 90 to the print management server 70. The print management server 70 performs determination processing in step S13 on the basis of the content of the designation. While the content of the designation of the print target file may be transmitted from the communication terminal 90 to the print management server 70 in response to the operation of pressing the upload button 213, the present invention is not limited to this example. For example, the content of the designation of the print target file may be transmitted at any time from the communication terminal 90 to the print management server 70 without waiting for the operation of pressing the upload button 213. To be more specific, the content of the designation of the print target file may be transmitted at any time from the communication terminal 90 to the print management server 70, using techniques such as Asynchronous JavaScript (registered trademark) and XML (Ajax).

In step S13, it is determined whether the file path designated in the file-path designation field 212 indicates a storage area in the communication terminal 90 or a storage outside the communication terminal 90. If the file path indicates a storage inside the communication terminal 90, the procedure immediately proceeds to step S31. If the file path indicates a storage outside the communication terminal 90, the procedure proceeds to step S23. The following description assumes a case where the file path indicates a storage inside the communication terminal 90 and the procedure proceeds to step S31 without proceeding to the step S23.

The aforementioned script is executed in response to the operation of pressing the upload button 213, and the print target file is transmitted from the communication terminal 90 to the gateway 30 (step S31).

At this time, a print output ID is also associated with the print target file and transmitted to the gateway 30 (step S31). In this way, the print target file is uploaded to the gateway 30. As a result, the gateway 30 passively acquires the print target file. When the operation of uploading the print target file to the gateway 30 is completed, the gateway 30 gives an upload completion notification and a print output ID (identification number) to the print management server 70 (step S32; see FIGS. 17 and 19). FIG. 17 is a flowchart of operations of the gateway 30. To be more specific, FIG. 17 illustrates operations performed when the gateway 30 receive, for example, the upload completion notification from the communication terminal 90.

In addition, a request to display the next operation screen is also transmitted from the communication terminal 90 to the print management server 70 in response to the operation of pressing the upload button 213. In response to this display request, the print management server 70 transmits display data for display of a print setting screen (not shown) to the communication terminal 90 (step S33). The communication terminal 90 displays the print setting screen on the basis of the display data and accepts a print setting operation from the user. The user makes various print settings (e.g., paper size and double-side/single-side) and then presses a print execution button (not shown).

In response to the operation of pressing the print execution button, the communication terminal 90 transmits the content of the print settings along with the print output ID to the print management server 70 (step S34).

Upon receiving the upload completion notification from the gateway 30 and the content of the print settings from the communication terminal 90, the print management server 70 confirms the relation between the upload completion notification and the content of the print settings on the basis of the print output IDs. More specifically, if it is confirmed that the print output ID transmitted along with the upload completion notification is identical to the print output ID transmitted along with the content of the print settings, the print management server 70 confirms that both of the upload completion notification and the content of the print settings are received for a printout identified by the print output ID. The procedure then proceeds to step S35.

In step S35, the print management server 70 generates PJL data on the basis of the received content of the print settings. This PJL data is data describing the print settings and other information. The PJL data does not include substantial data of the print target file.

In the next step S36, the print management server 70 transmits this PJL data along with the print output ID to the gateway 30. Upon receiving the upload completion notification along with the print output ID from the gateway 30 (in the aforementioned step S32), the print management server 70 determines that the gateway 30 is supposed to perform processing for generating print job data, the processing involving data merging processing, and therefore transmits the PJL data along with the print output ID to the gateway 30 (step S36). In other words, by transmitting the PJL data along with the print output ID, the print management server 70 instructs the gateway 30 to perform the processing for generating print job data, the processing involving processing for merging the PJL data and the data of the print target file received separately by the gateway 30. In short, the print management server 70 transmits a command to generate print job data to the gateway 30.

Upon receiving the PJL data (print setting instruction) along with the print output ID (step S36), the gateway 30 interprets that the command to generate print job data has been received. Then, in step S37 (see FIG. 17), the gateway 30 confirms, on the basis of the print output ID, the relation (correspondence) between the PJL data transmitted from the print management server 70 and the print target file transmitted separately from the communication terminal 90. The gateway 30 further generates print job data on the basis of the print target file and the PJL data (step S37).

Next, the gateway 30 transmits the print job data to the MFP 10 (step S51; see, for example, FIG. 17).

The MFP 10 prints out the designated print target file in accordance with the designated content of the print settings on the basis of the received print job data.

Note that the processing performed in steps S23 to S29 and the processing performed in steps S40 to S43 will be described later.

In the operations described above, when the print target file is transmitted via a communication terminal 90 and the communication terminal 90 is present inside the predetermined LAN 109, it is determined that the print target file is present inside the predetermined LAN 109 (steps S2 and S3). Then, the print management server 70 transmits, to the gateway 30, a job-data generation command to generate print job data on the basis of the print setting instruction and the print target file acquired by the gateway 30 (step S36). The gateway 30 generates print job data on the basis of the print target file that is transmitted directly from the communication terminal 90 and the print setting information and the job-data generation command that are transmitted from the print management server 70.

Figure 31:
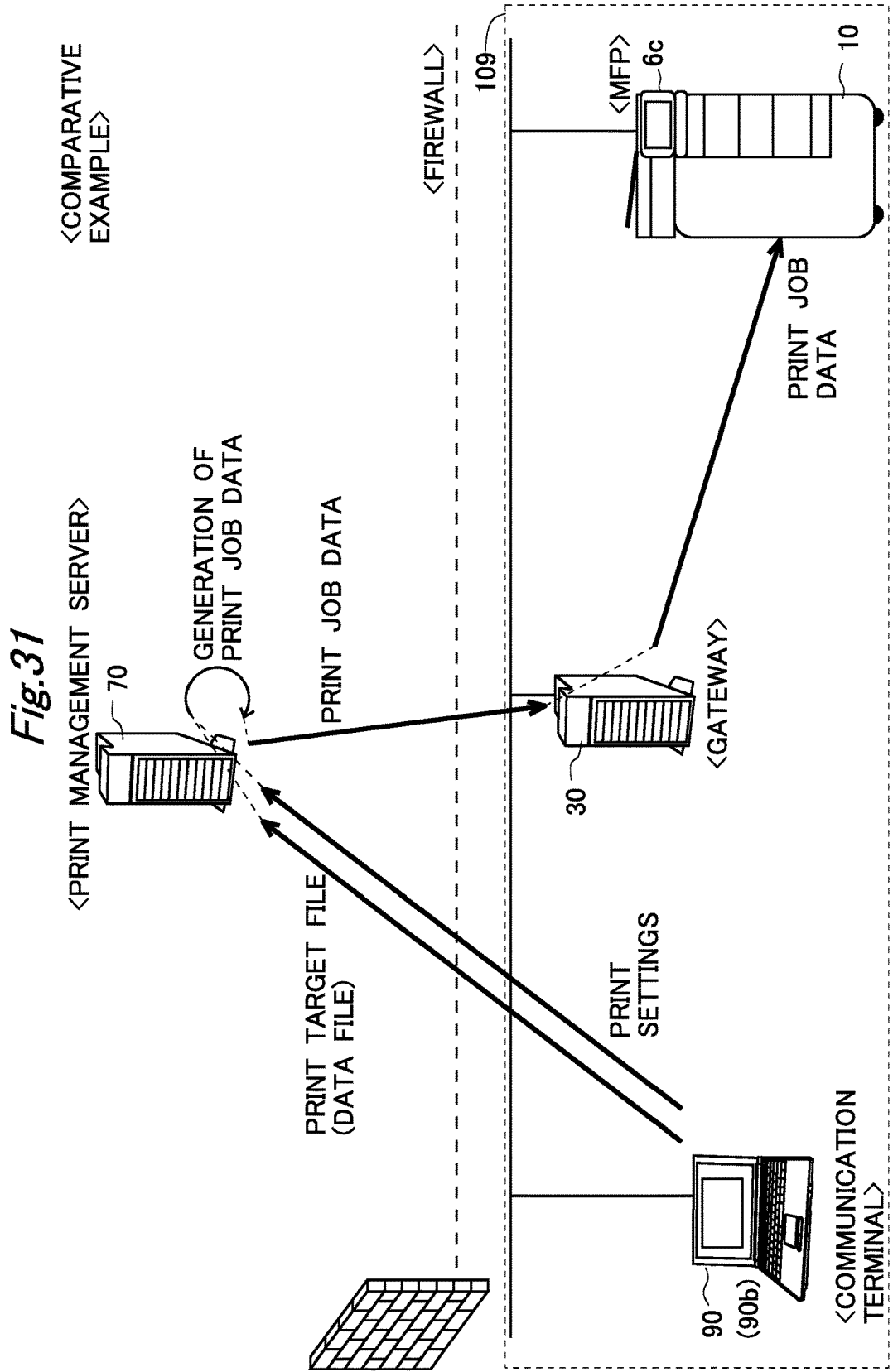
FIG. 31 is a conceptual diagram illustrating an operation according to a comparative example.

In this case, the print target file is only transmitted from the communication terminal 90 directly to the gateway 30. Accordingly, an increase in communication load can be more suppressed than in the case where the data of the print target file is transmitted from the communication terminal 90 to the print management server 70 and then substantially transmitted from the print management server 70 to the gateway 30 as illustrated in FIG. 31. In addition, communications are completed only within the LAN 109. Thus, a risk of information leakage can be more reduced than in the case where the print target file is transmitted to the outside of the LAN 109.

If it is determined in step S3 that the communication terminal 90 is not present inside the same LAN as that of the MFP 10, the procedure proceeds from step S3 to step S8. In step S8 (FIG. 15), a normal operation is performed. More specifically, the print management server 70 transmits display data (see FIG. 25) for display of the default operation screen 210 (operation screen 210 before change) to the communication terminal 90 (step S81) and receives the data of the print target file that is transmitted using the operation screen 210 (step S82; see also FIG. 10). The print management server 70 also transmits display data for display of the operation screen for designating the content of print settings to the communication terminal 90 (step S83) and receives print setting information that is input using the operation screen from the communication terminal 90 (step S84). The print management server 70 further generates PJL data on the basis of the print target file and the print setting information and generates print job data on the basis of the PJL data and the print target file (step S85). Then, the print management server 70 transmits the print job data to the gateway 30 (step S86), and the gateway 30 transmits (transfers) the print job data to the MFP 10. The MFP 10 performs print output processing on the basis of the received print job data. In this way, the print management server 70 performs processing such as generating print job data. FIG. 10 illustrates a state in which a communication terminal 90 that is present outside the LAN 109 performs a print output operation in the first mode M1.

Operations in Mode M1 (Part 2)

Figure 6:
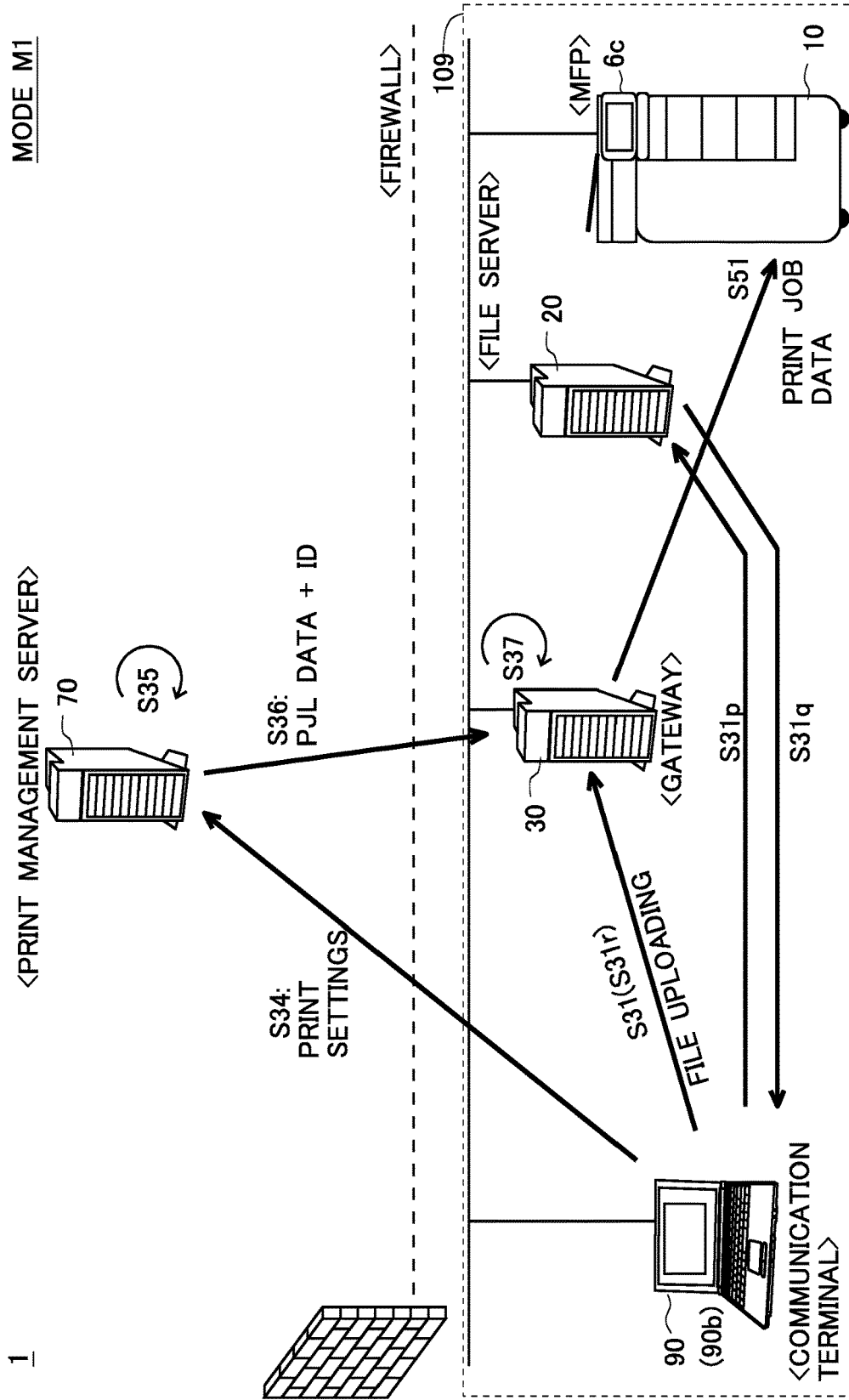
FIG. 6 is a conceptual diagram illustrating an operation in the mode M1 (file printing operation outside the communication terminal).
Figure 20:
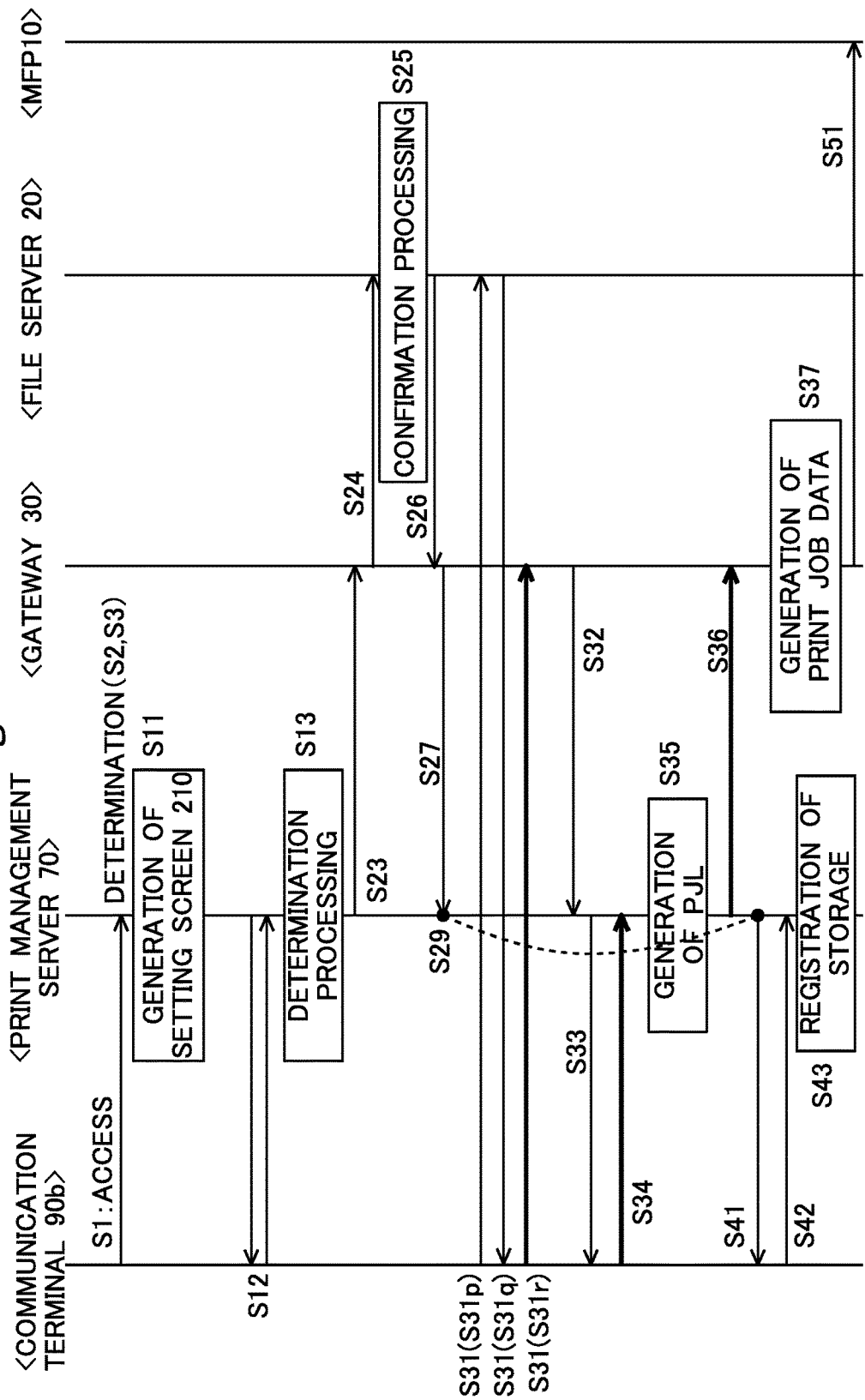
FIG. 20 is a timing chart of the operation in FIG. 6.

Next, a case where the mode M1 is selected (i.e., a mode in which the data of the print target file is transmitted and received via a communication terminal 90) and where a file that is stored outside the communication terminal 90 (in particular, a file stored in the LAN 109) is transmitted to and received from the communication terminal 90 inside the LAN 109 will be described with reference to, for example, FIGS. 6 and 20. FIG. 6 is a conceptual diagram illustrating operations performed in the mode M1 when a file that is stored outside a communication terminal 90 (a file stored in the file server 20) is uploaded from the communication terminal 90 inside the LAN 109 and printed out. FIG. 20 is a timing chart of these operations.

In this case as well, operations similar to those illustrated in, for example, FIG. 5 are performed. However, in this case, it is determined in step S13 (FIG. 13) that the file path designated in the file-path designation field 212 (FIG. 24) indicates a storage outside the communication terminal 90 (e.g., a folder in the file server 20), and the procedure proceeds to step S23.

In step S23, the print management server 70 transmits, to the gateway 30, a request (device-information acquisition request) to acquire device information regarding a device (corresponding device) that corresponds to the designated file path. The gateway 30 accesses the corresponding device (e.g., file server 20) on the basis of the device-information acquisition request and acquires management information base (MIB) information (management information) regarding the corresponding device (steps S24, S25, and S26; see FIGS. 7 and 20). The gateway 30 then acquires device type information regarding the corresponding device on the basis of the MIB information and transmits the acquired device type information to the print management server 70 (step S27). Upon receiving the device type information (e.g., type such as a file server, an NAS, or a personal computer) from the gateway 30, the print management server 70 acquires the device type information regarding the corresponding device. By receiving the device type information regarding the device (corresponding device) that corresponds to the file path, the print management server 70 can confirm the presence of the corresponding device. The print management server 70 can also determine, on the basis of the device type information, whether the corresponding device is a "device that can store files."

If the presence of a "device that can store files" is determined on the basis of the device type information in step S28, the procedure proceeds from step S28 to step S29. In step S29, a registration flag is turned on (ON) and the procedure proceeds to step S31. If effective device type information is not received by the print management server 70, the registration flag remains off (OFF), and the procedure proceeds to step S31. This registration flag ("ON" or "OFF") is used in step S40, which will be described later.

In step S31, the communication terminal 90 first accesses a storage device (file storage device) of the print target file in accordance with the file path designated in the file-path designation field 212, acquires (receives) the print target file (to be more specific, the data of the print target file) from the file storage device, and temporarily stores the print target file in a storage inside the communication terminal 90 (steps S31*p* and S31*q*; see, for example, FIGS. 6 and 20). Then, the communication terminal 90 transmits the print target file that is acquired and temporarily stored therein, to the gateway 30 (step S31 or S31*r*) as described above. Thereafter, the operations in steps S32 to S36 are performed (see also FIG. 13).

Then, if it is determined in step S40 that the registration flag is ON, the procedure proceeds to step S41. In steps S41 to S43, processing such as registering the folder path designated in the file-path designation field 212 for use with the operation screen 310 is automatically started.

Figure 29:
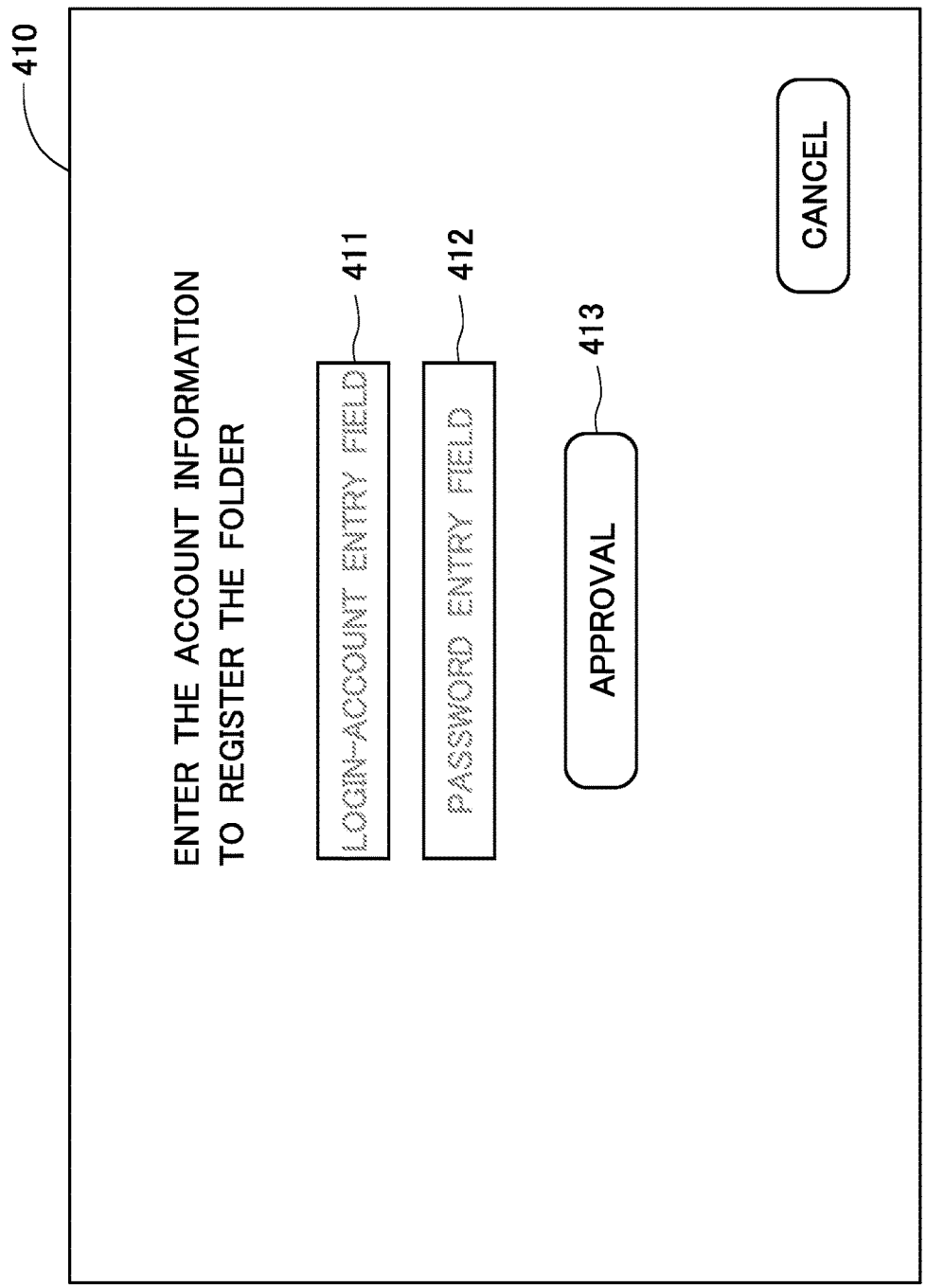
FIG. 29 illustrates a registration screen.

More specifically, in step S41, the print management server 70 transmits display data for display of the operation screen 410 (see FIG. 29) to the communication terminal 90. The communication terminal 90 displays the operation screen 410 on the basis of this display data. As illustrated in FIG. 29, the operation screen (registration screen) 410 displays a character string saying "Enter the account information to register the folder" and also includes, for example, an account entry field 411, a password entry field 412, and the approval button 413.

The user enters, for example, account information (login ID and password) if the user wants to register the folder (folder that stores the file designated on the operation screen 210 (see, for example, FIG. 24)). More specifically, the user enters the login ID for accessing the folder in the account entry field 411, enters the password corresponding to the login ID in the password entry field 412, and presses the approval button 413.

When the approval button 413 is pressed, the communication terminal 90 transmits the account information to the print management server 70.

When the account information received from the communication terminal 90 and the file path designated in the file-path designation field 212 on the operation screen 210 are acquired, the print management server 70 performs a registration operation on the basis of that information. More specifically, a folder (e.g., intra-LAN folder F2 ("¥¥server¥ . . . ¥ . . . ¥folder2)") immediately above the file path designated in the file-path designation field 212 (FIG. 24) is additionally registered as a folder that is listed in the folder-list display area 311 of the operation screen 310. If it is confirmed that the folder is present inside the LAN 109 (the same LAN as that of the MFP 10), this information (i.e., the presence of the folder inside the same LAN 109 as that of the MFP 10) is also registered.

In this way, when a file in a specific network folder inside the LAN 109 is designated as a print target file on the operation screen 210, the print management server 70 registers a folder path of that specific network folder as a folder path that can be used with the operation screen 310. Thereafter, the print management server 70 accepts designation of the print target file using the folder path of the specific network folder on the operation screen 310.

This enables the user to easily print out files in the folder from now on by using the operation screen 310. The user is also able to register a "folder path that can be used with the operation screen 310" through a simple operation (e.g., with the pressing of the approval button 413).

While, in the present example, all network folders for which the presence of file storage devices designated on the operation screen 210 has been confirmed are registered as "folder paths that can be used with the operation screen 310," the present invention is not limited to this example. For example, the print management server 70 may register a folder (folder path of the network folder) of the file storage device designated on the operation screen 210 as a "folder path that can be used with the operation screen 310" on condition that the file storage device is present inside the LAN 109 (the same LAN as that of the MFP 10).

To be more specific, the print management server 70 transmits, to the gateway 30, an inquiry about "whether the storage location of the print target file is a storage device inside the LAN 109." The print management server 70 determines, on the basis of the result of the inquiry (the result of a reply from the gateway 30), whether the storage folder of the print target file is present inside the LAN 109. Then, if it is determined that the storage folder of the print target file is present inside the LAN 109, this storage folder may be registered as a "folder path that can be used with the operation screen 310." Also, this information indicating that the storage folder is an intra-LAN folder (folder inside the same LAN as that of the MFP 10) may be registered together with the folder path.

Figure 7:
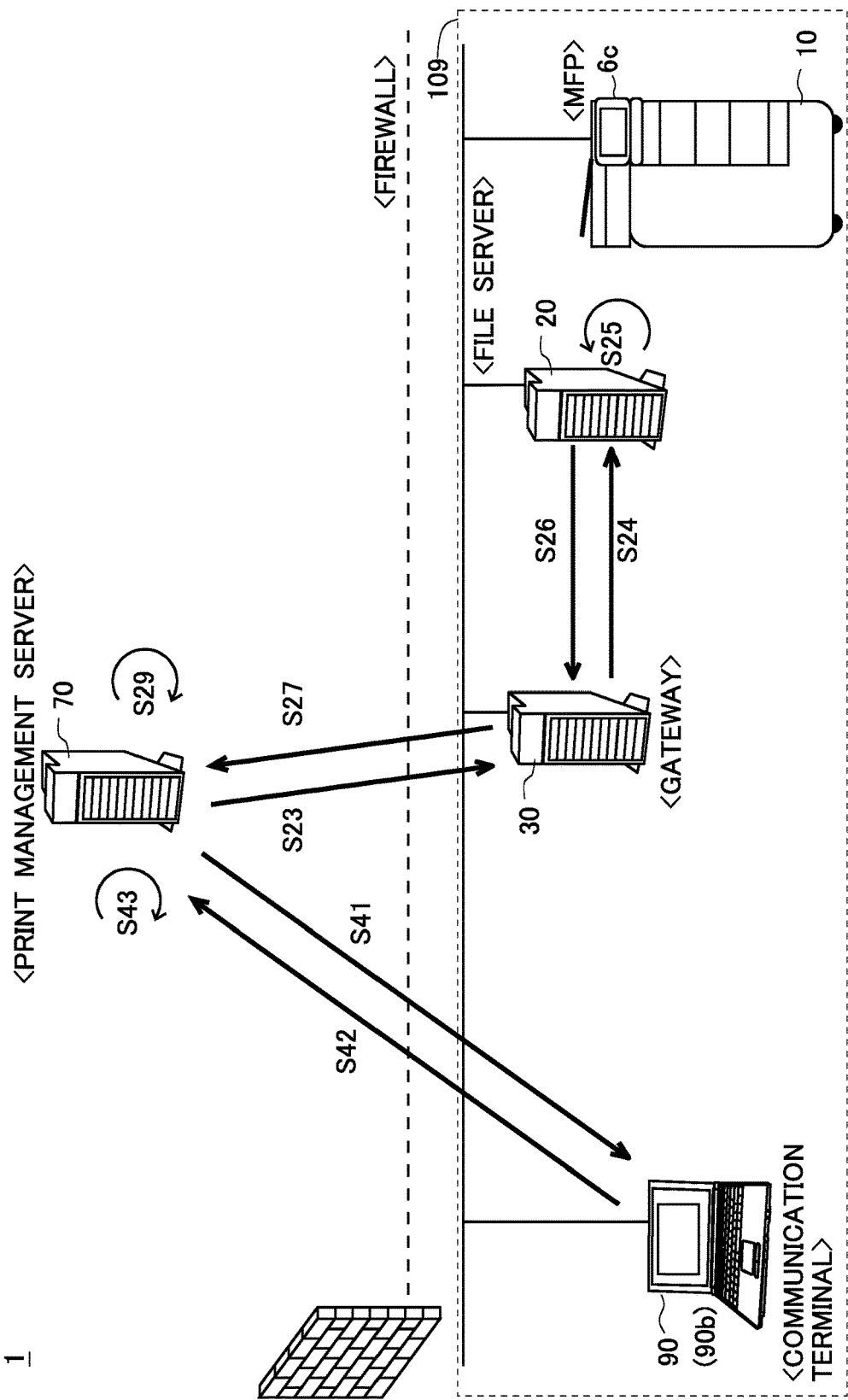
FIG. 7 illustrates an operation of acquiring device information.

While, in the present example, the determination as to whether the device corresponding to the file path of the print target file is present (and is a storage device) inside the same LAN is made after the designation of the file path as illustrated in, for example, FIGS. 7 and 20, the present invention is not limited to this example.

For example, prior to the print output instruction from the communication terminal 90, the gateway 30 may perform processing for searching for devices inside the LAN 109 in advance and acquire information regarding the devices inside the predetermined LAN 109 (including device type information regarding the devices) in advance. In other words, the gateway 30 may specify storage devices that are present inside the LAN 109 to which the gateway 30 belongs, in advance. To be more specific, the gateway 30 may first detect devices inside the same LAN 109 by using, for example, PING, and determine the type of each device (e.g., whether the device is a storage device) by acquiring MIB information regarding the detected devices. In this way, the gateway 30 may acquire information regarding the storage devices inside the LAN 109 in advance prior to the print output instruction given by the communication terminal 90.

Then, the print management server 70 inquires of the gateway 30 as to whether the storage location of the print target file is a storage device inside the LAN 109. The gateway 30 transmits a replay to the inquiry from the print management server 70 (a result of the inquiry) to the print management server 70 on the basis of the previously acquired information regarding the storage devices inside the LAN 109. The print management server 70 that has received the result of the inquiry from the gateway 30 may determine, on the basis of the result of the inquiry, whether the corresponding device (device corresponding to the file path designated in the file-path designation field 212 in FIG. 24) is present inside the LAN 109.

Acquiring the storage device information in advance at the gateway 30 eliminates the need to perform, for example, the processing for confirming the storage device (steps S23 to S27 in FIGS. 7 and 20) after the print output instruction. Thus, the processing after the print output instruction can be performed in a relatively short period of time.

7. Variations

While the above has been a description of embodiments of the present invention, the present invention is not intended to be limited to the contents described above.

For example, while, in the above-described embodiments, the print setting operation in step S34 is performed after the file designation operation in step S12 in the mode M1 (see FIGS. 12 and 13), the present invention is not limited to this example. The print setting operation may be performed prior to the file designation operation. Alternatively, the file designation operation and the print setting operation may be performed (almost simultaneously) using the same operation screen. As another alternative, default information may be transmitted as the print setting information, instead of performing the print setting operation.

While, in the above-described embodiments, the print setting information is transmitted from the communication terminal 90 to the gateway 30 via the print management server 70 (see, for example, steps S34 and S36 and FIG. 5), the present invention is not limited to this example. For example, the print setting information may be transmitted from the communication terminal 90 directly to the gateway 30 (without the intervention of the print management server 70).

While, in the above-described embodiments, the router 60 is separately provided from the gateway 30, the present invention is not limited to this example. For example, the gateway 30 may have a function of the router (function similar to that of the router 60).

While, in the above-described embodiments, the communication terminals 90 are constructed as notebook-type personal computers, the present invention is not limited to this example, and the communication terminals 90 may be constructed as, for example, smartphones or tablets.

While, in the above-described embodiments, the gateway 30 is constructed by, for example, a personal computer, the present invention is not limited to this example, and the gateway 30 may be constructed by an MFP.

While the invention has been shown and described in detail, the foregoing description is in all aspects illustrative and not restrictive. It is therefore understood that numerous modifications and variations can be devised without departing from the scope of the invention.

What is claimed is:

1. A print management server provided outside a predetermined LAN, comprising:
    a receiver accepting a print output instruction from a communication terminal of a user, the print output instruction being given to a print output device provided inside the predetermined LAN and being an instruction to print out a print target file;
    a processor determining whether the print target file is present inside the predetermined LAN; and
    a transmitter, when it is determined that the print target file is present inside the predetermined LAN, transmitting a generation command to a communication relay device inside the predetermined LAN, the generation command being a command to generate print job data on the basis of the print target file acquired by the communication relay device and a print setting instruction
    wherein the processor, when it is determined that the print target file is not present inside the predetermined LAN, acquires the print target file and generates print job data on the basis of the print target file and the print setting instruction; and
    wherein the transmitter transmits the print job data, not the generation command, to the communication relay device to cause the communication relay device to transmit the print job data to the print output device.

2. The print management server according to claim 1, wherein the processor, when the print target file is transmitted via the communication terminal and when the communication terminal is present inside the predetermined LAN, determines that the print target file is present inside the predetermined LAN.

3. The print management server according to claim 2,
    wherein the processor, when the print target file is transmitted via the communication terminal and when the communication terminal is present inside the predetermined LAN, determines that the print target file is present inside the predetermined LAN;
    wherein the transmitter transmits display data to the communication terminal, the display data being described using a page description language and a script; and
    wherein the script has a content indicating that the print target file that is designated by a user operation using a first operation screen is to be transmitted to the communication relay device, instead of the print management server, the first operation screen being displayed on the communication terminal on the basis of the display data.

4. The print management server according to claim 3, wherein the transmitter:
    when it is determined that the print target file is not present inside the predetermined LAN, transmits a first script to the communication terminal, the first script having a content indicating that the print target file is to be transmitted to the print management server; and when it is determined that the print target file is present inside the predetermined LAN, transmits a second script as the script to the communication terminal, the second script being generated by changing a transmission destination of the print target file in the first script from the print management server to the communication relay device.

5. The print management server according to claim 1, wherein
the receiver receives a designation of a file path of the print target file from the communication terminal, and
the processor, when a storage location of the print target file that is specified by the designation of the file path is a storage device inside the predetermined LAN, determines that the print target file is present inside the predetermined LAN.

6. The print management server according to claim 5, wherein the transmitter, when it is determined that the print target file is present inside the predetermined LAN, transmits an acquisition command to acquire the print target file to the communication relay device.

7. The print management server according to claim 6, wherein the transmitter issues the acquisition command to the communication relay device by describing the designation of the file path of the print target file in a header of a Hypertext Transfer Protocol (HTTP) that is transmitted to the communication relay device.

8. The print management server according to claim 3,
wherein the transmitter, by transmitting the display data to the communication terminal, causes the communication terminal to selectively display a plurality of operation screens and enables a user to designate the print target file, the plurality of operation screens including the first operation screen and a second operation screen;
wherein the first operation screen is a screen for designating the print target file, together with a folder path of the print target file, to transmit the print target file via the communication terminal;
wherein the second operation screen is a screen for designating the print target file by using a folder path that is registered in advance; and
wherein the processor, when a file in a network folder inside the predetermined LAN is designated as the print target file on the first operation screen, registers a folder path of the network folder as a folder path that can be used with the second operation screen, and accepts designation of the print target file using the folder path of the network folder on the second operation screen.

9. The print management server according to claim 8, wherein the processor registers the folder path of the network folder as a folder path that can be used with the second operation screen, on condition that a storage location of the print target file designated on the first operation screen is a device inside the predetermined LAN.

10. The print management server according to claim 9,
wherein the transmitter transmits an inquiry as to whether the storage location of the print target file is a storage device inside the predetermined LAN, to the communication relay device; and
wherein the processor determines whether the print target file is present inside the predetermined LAN, on the basis of a result of the inquiry.

11. A non-transitory computer-readable recording medium for recording a program that causes a computer built into a print management server provided outside a predetermined LAN to execute the steps of:
a) accepting a print output instruction from a communication terminal of a user, the print output instruction being given to a print output device provided inside the predetermined LAN and being an instruction to print out a print target file;
b) determining whether the print target file is present inside the predetermined LAN;
c) when it is determined that the print target file is present inside the predetermined LAN, transmitting a generation command to a communication relay device inside the predetermined LAN, the generation command being a command to generate print job data on the basis of the print target file acquired by the communication relay device and a print setting instruction;
d) when it is determined that the print target file is not present inside the predetermined LAN, acquiring the print target file and generating print job data on the basis of the print target file and the print setting instruction; and
e) when transmitting the print job data, not the generation command, causing the communication relay device to transmit the print job data to the print output device.

\* \* \* \* \*